(12) United States Patent
Watanabe

(10) Patent No.: US 7,536,592 B2
(45) Date of Patent: May 19, 2009

(54) STORAGE SYSTEM AND SNAPSHOT DATA PREPARATION METHOD IN STORAGE SYSTEM

(75) Inventor: Haruaki Watanabe, Isehara (JP)

(73) Assignee: Hitachi, Ltd., Tokyo (JP)

( * ) Notice: Subject to any disclaimer, the term of this patent is extended or adjusted under 35 U.S.C. 154(b) by 1019 days.

(21) Appl. No.: 11/043,717

(22) Filed: Jan. 25, 2005

(65) Prior Publication Data

US 2006/0136771 A1 Jun. 22, 2006

(30) Foreign Application Priority Data

Dec. 6, 2004 (JP) .............................. 2004-353153

(51) Int. Cl.
*G06F 11/00* (2006.01)
(52) U.S. Cl. ......................... 714/15; 707/204
(58) Field of Classification Search ....................... None
See application file for complete search history.

(56) References Cited

U.S. PATENT DOCUMENTS

| | | | | |
|---|---|---|---|---|
| 5,379,412 | A * | 1/1995 | Eastridge et al. ............ | 711/162 |
| 7,127,578 | B2 * | 10/2006 | Nagata ........................ | 711/162 |
| 7,167,880 | B2 * | 1/2007 | Amano et al. ................ | 707/205 |
| 2001/0044807 | A1 | 11/2001 | Kleiman et al. | |
| 2002/0194529 | A1 * | 12/2002 | Doucette et al. ............... | 714/6 |
| 2004/0168034 | A1 | 8/2004 | Homma et al. | |
| 2005/0198083 | A1 * | 9/2005 | Saika et al. .................. | 707/204 |

FOREIGN PATENT DOCUMENTS

JP 2004-118413 A 4/2004

* cited by examiner

*Primary Examiner*—Gabriel L Chu
(74) *Attorney, Agent, or Firm*—Townsend and Townsend and Crew LLP

(57) ABSTRACT

The present invention is devised so that snapshot data preparation processing does not end abnormally as a result of the pool region becoming full with saved data from the primary logical volume during snapshot data preparation. When the CHA receives a snapshot data preparation request, the CHA checks whether or not update information is present in the logical volume that is the object of this data preparation. If such information is present (YES in S51), a check is made from the number of slots in the in the volume control information and the updating amount count value in the update information in order to ascertain whether or not the proportion of the updating amount relative to the number of slots is equal to or greater than the threshold value in the threshold value control information (S52). If this proportion is equal to or greater than the threshold value (YES in S52), the update information is initialized (S53), and physical snapshot control is started (S54). If such is not the case (NO in S52), the update information is initialized (S55), and logical snapshot control is started (S56).

16 Claims, 31 Drawing Sheets

SYSTEM CONSTRUCTION DIAGRAM

SYSTEM CONSTRUCTION DIAGRAM

UPDATE INFORMATION

FIG. 5

UPDATE INFORMATION CONTROL INFORMATION

| UPDATE INFORMATION NUMBER | USE STATE |
|---|---|
| 0 | UNUSED |
| 1 | IN USE |
| 2 | IN USE |

THRESHOLD VALUE CONTROL INFORMATION

| THRESHOLD VALUE CONTROL INFORMATION | 50% |

CONSTRUCTION OF LOGICAL SNAPSHOT SYSTEM

FIG. 12

HDD CONTROL INFORMATION

| | | |
|---|---|---|
| STATE | NORMAL | ~71 |
| CORRECTABLE ERROR FREQUENCY | 0 | ~73 |
| UNCORRECTABLE ERROR FREQUENCY | 0 | ~75 |

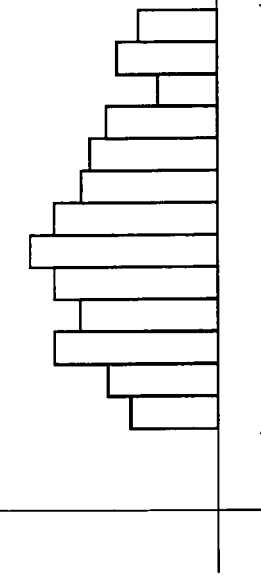
FIG. 15(A)
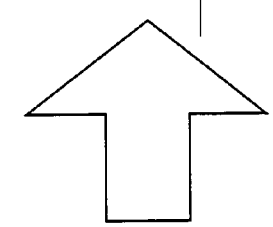
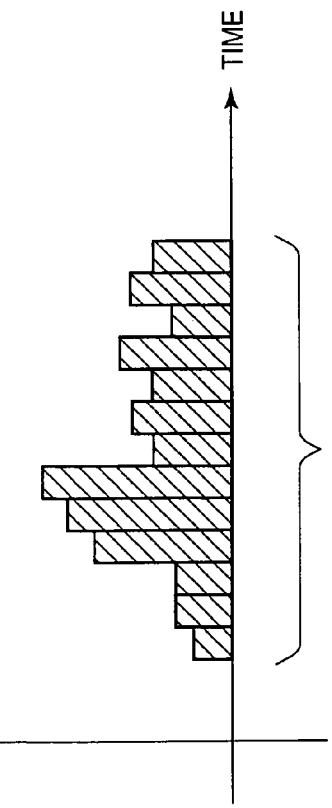
FIG. 15(C)
FIG. 15(B)

FIG. 20

POSITION INFORMATION

| SECONDARY VOLUME SLOT NUMBER | VOLUME NUMBER | SLOT NUMBER | |
|---|---|---|---|
| 0 | 1 | 100 | ~103 |
| 1 | 3 | 100 | |
| ⋮ | ⋮ | ⋮ | |
| 121 | 123 | 125 | |

FIG. 21

UPDATE BIT MAP    105

COPYING BIT MAP      107

01011111
...

PAIR CONTROL INFORMATION

COMMAND PARAMETERS OF SNAPSHOT
PREPARATION COMMAND

STORAGE SYSTEM AND SNAPSHOT DATA PREPARATION METHOD IN STORAGE SYSTEM

CROSS-REFERENCE TO PRIOR APPLICATION

This application relates to and claims priority from Japanese Patent Application No. 2004-353153, filed on Dec. 6, 2004, the entire disclosure of which is incorporated herein by reference.

BACKGROUND OF THE INVENTION

1. Field of the Invention

The present invention relates to a storage system which exchanges data with a higher-level device, and a snapshot data preparation method in this storage system.

2. Description of the Related Art

Conventionally, in information processing systems comprising a storage system, a proposal has been made with the object of reducing the load on host devices relating to snapshot data control, and increasing the speed of the storage system. In this proposal, when a host device desires the preparation of snapshot data, this host device transmits an instruction indicating a snapshot data preparation request to a storage system, the control part (disk control device) of the storage system reads out user data from a user data region in the disk driving device of the storage system, and this readout user data is stored in a snapshot data region in the disk driving device, so that snapshot data is prepared. As a result, the burden of snapshot data preparation is dispersed between the host device and the storage system. Furthermore, the amount of data that is exchanged between the host device and the storage system for the purpose of snapshot data preparation can be reduced (for example, see Japanese Patent Application Laid-Open No. 2004-118413).

Known methods of snapshot data preparation include a system called a "physical snapshot" (so-called shadow image) and a system called a "logical snapshot" (so-called quick shadow). In the logical snapshot system, a pool region which is a data space used to save data prior to updating among the original data stored in the primary logical volume is set in the disk drive device. Furthermore, from the point in time at which backup of the primary (logical) volume is initiated, original data prior to updating is stored in the pool region only for the storage region in which data updating of the primary (logical) volume by the writing of new data or the like is performed. In this state, if there is a read request for snapshot data from the host device, the disk control device prepares the data at the backup starting point by synthesizing the data stored in the pool region and the original data that has not been updated in the primary (logical) volume, and transfers this data to the host device.

In the logical snapshot system, only original data prior to updating among the original data stored in the primary (logical) volume is stored in the pool region; accordingly, the following advantage is obtained: namely, if the amount of updated data is small, the amount of the pool region that is used is also small. However, when the amount of updated data is large, the amount of the pool region that is used is also unavoidably increased to a corresponding extent, and especially when a plurality of pairs of primary (logical) volumes and secondary (logical) volumes are formed, and snapshot data of these volumes of the like is prepared, it is difficult to predict the extent of future pool region use. In some cases, furthermore, the pool region may become filled with saved data from the primary (logical) volume, so that the snapshot data preparation processing ends abnormally.

SUMMARY OF THE INVENTION

Accordingly, it is an object of the present invention to prevent the data space used to save data prior to updating from becoming filled with saved data from the primary (logical) volume so that snapshot data preparation processing ends abnormally during snapshot data preparation in a storage system.

The storage system according to a first aspect of the present invention comprises a physical snapshot execution part which writes data that has been updated into both a primary storage device and a secondary storage device, a logical snapshot execution part which writes input data into a primary storage device, and which writes differential data between this data and data prior to updating into a secondary storage device, an update data search part which performs a search in order to ascertain whether or not data that is to be updated is present in the primary storage device involved in a snapshot data preparation request when such a preparation request is received from a higher-level device, a data updating amount judgment part which judges whether or not the amount of data updated in the primary storage device is greater than a specified value when the update data search part finds that update data is present in the primary storage device, and a snapshot execution part selection part which selectively drives the physical snapshot execution part when the data updating amount judgment part judges that the amount of updated data is greater than the specified value, and which selectively drives the logical snapshot execution part when the data updating amount judgment part judges that the amount of updated data is less than the specified value, or when no update data is present in the storage device.

In a preferred embodiment of the first aspect of the present invention, the specified value is a preset threshold value relating to the amount of updated data, and this threshold value is a default value.

In a different embodiment from the embodiment described above, the specified value is a preset threshold value relating to the amount of updated data, and this threshold value can be freely set or altered by the user.

Furthermore, in a different embodiment from the embodiment described above, the system is devised so that prior to the driving of the physical snapshot execution part or the logical snapshot execution part, the snapshot execution part selection part initializes the information relating to the data updating of the device involved in the snapshot data preparation request among the information relating to the updating of data that is set according to the individual storage devices.

Furthermore, in a different embodiment from the embodiment, the deletion of the snapshot data that is prepared by the physical snapshot execution part or the logical snapshot execution part includes at least processing that initializes the information relating to the updating of the data of the storage device involved in the snapshot data preparation request.

Furthermore, in a different embodiment from the embodiment, the processing of writing data into the storage device based on a data write command from the higher-level device is accomplished by performing processing which indicates that data has been updated in the information relating to the updating of data corresponding to the storage device.

The storage system according to a second aspect of the present invention comprises a physical snapshot execution part which writes data that has been updated into both a primary storage device and a secondary storage device, a logical snapshot execution part which writes input data into a primary storage device, and which writes differential data between this data and data prior to updating into a secondary storage device, an update data search part which performs a search in order to ascertain whether or not data that is to be updated is present in the primary storage device involved in a snapshot data preparation request when such a preparation request is received from a higher-level device, an access degree-of-competition judgment part which is devised so that when the update data search part finds update data in the primary storage device, and the primary storage device and the secondary storage device are simultaneously accessed from the higher-level device, this access degree-of-competition judgment part judges whether or not the degree of competition between the access to the primary storage device and the access to the secondary storage device is high, and a snapshot execution part selection part which selectively drives the physical snapshot execution part when the access degree-of-competition judgment part judges that the access degree of competition is high, and which selectively drives the logical snapshot execution part when the access degree-of-competition judgment part judges that the access degree of competition is not high.

In a preferred second embodiment of this second aspect of the present invention, the access degree-of-competition judgment part judges whether the access degree of competition is high or not by checking the degree of utilization of the primary storage device involved in the snapshot data preparation request.

The storage system according to a third aspect of the present invention comprises a physical snapshot execution part which writes data that has been updated into both a primary storage device and a secondary storage device, a logical snapshot execution part which writes input data into a primary storage device, and which writes differential data between this data and data prior to updating into a secondary storage device, an update data search part which performs a search in order to ascertain whether or not data that is to be updated is present in the primary storage device involved in a snapshot data preparation request when such a preparation request is received from a higher-level device, a trouble degree-of-occurrence judgment part which judges whether or not the degree of occurrence of trouble in the primary storage device is high when the update data search part finds update data in the primary storage device, and a snapshot execution part selection part which selectively drives the physical snapshot execution part when the trouble degree-of-occurrence judgment part judges that the degree of occurrence of trouble in the primary storage device is high, and which selectively drives the logical snapshot execution part when the trouble degree-of-occurrence judgment part judges that the degree of occurrence of the trouble is not high.

In an appropriate embodiment of the third aspect of the present invention, the judgment of the relative value of the degree of occurrence of the trouble by the trouble degree-of-occurrence judgment part is accomplished by checking the trouble occurrence rate of the HDD constituting the primary storage device.

In a different embodiment from the embodiment described above, the trouble occurrence rate of the HDD is determined in accordance with the magnitude of the load in one or a plurality of HDD(s) actually holding the data that is assigned to the primary storage device involved in the snapshot data preparation request.

Furthermore, in a different embodiment from the embodiment described above, the snapshot execution part selection part drives the physical snapshot execution part if the magnitude of the load in the one or plurality of HDD(s) is greater than a specified threshold value, and the snapshot execution part selection part drives the logical snapshot execution part if the magnitude of the load is smaller than the specified threshold value.

Furthermore, in a different embodiment from the embodiment, the magnitude of the load in the one or plurality of HDD(s) is determined by synthesizing the history of the IOPS of a primary storage volume, which is the IOPS during snapshot data preparation, and the history of the IOPS of a secondary storage volume, which is the IOPS during snapshot data preparation.

The storage system according to a fourth aspect of the present invention comprises a physical snapshot execution part which writes data that has been updated into both a primary storage device and a secondary storage device, a logical snapshot execution part which writes input data into a primary storage device, and which writes differential data between this data and data prior to updating into a secondary storage device, an empty region monitoring part which monitors the empty region of a data storage region that is provided in order to save the data stored in the primary storage device involved in a snapshot data preparation request when there is such a data preparation request from a higher-level device, and a snapshot execution part selection part which selectively drives the physical snapshot execution part when the empty region monitoring part judges that the empty region in the data storage region is small, and which selectively drives the logical snapshot execution part when the empty region monitoring part judges that the empty region is not small.

In a preferred embodiment of the fourth aspect of the present invention, the monitoring of the empty region of the data storage region by the empty region monitoring part, the selection of the driving of the physical or logical snapshot execution part by the snapshot execution part selection part, and the checking of the reliability of the primary storage device in which original data corresponding to the snapshot data prepared by the logical snapshot execution part is stored, are performed periodically at specified time intervals.

The snapshot data preparation method in a storage system according to a fifth aspect of the present invention comprises a first step in which a physical snapshot that writes data that has been updated into both a primary storage device and a secondary storage device is executed, a second step in which a logical snapshot that writes input data into the primary storage device, and that writes differential data between this data and data prior to updating into the secondary storage device is executed, a third step in which a search is made in order to ascertain whether or not data that is to be updated is present in the primary storage device involved in a snapshot data preparation request when such a preparation request is received from a higher-level device, a fourth step which is devised so that when update data is found in the primary storage device in the third step, a judgment is made as to whether or not the amount of data that is to be updated in the primary storage device is greater than a specified value, and a fifth step which is devised so that when it is judged in the fourth step that the amount of data that is to be updated is greater than the specified value, the execution of the physical snapshot is selected, while when it is judged that the amount of data that is to be updated is smaller than the specified value, or when update data is not found in the storage device, the execution of the logical snapshot is selected.

BRIEF DESCRIPTION OF THE DRAWINGS

FIG. 5 is an explanatory diagram showing one example of the update information control information that is stored in the control memory of the storage system constituting a first embodiment of the present invention;

FIG. 6 is an explanatory diagram showing one example of the threshold value control information that is stored in the control memory of the storage system constituting a first embodiment of the present invention;

FIG. 12 is an explanatory diagram showing one example of the HDD control information that is stored in the control memory of the storage system constituting a second embodiment of the present invention;

FIG. 15 is an explanatory diagram showing the load in the HDD group in which data assigned to the primary (logical) volume is actually held in the storage system constituting a third embodiment of the present invention;

FIG. 20 is an explanatory diagram showing one example of the position information shown in FIG. 16;

FIG. 21 is an explanatory diagram showing one example of the updating bit map shown in FIG. 16;

FIG. 22 is an explanatory diagram showing one example of the copying bit map shown in FIG. 16;

DESCRIPTION OF THE PREFERRED EMBODIMENTS

Figure 1:
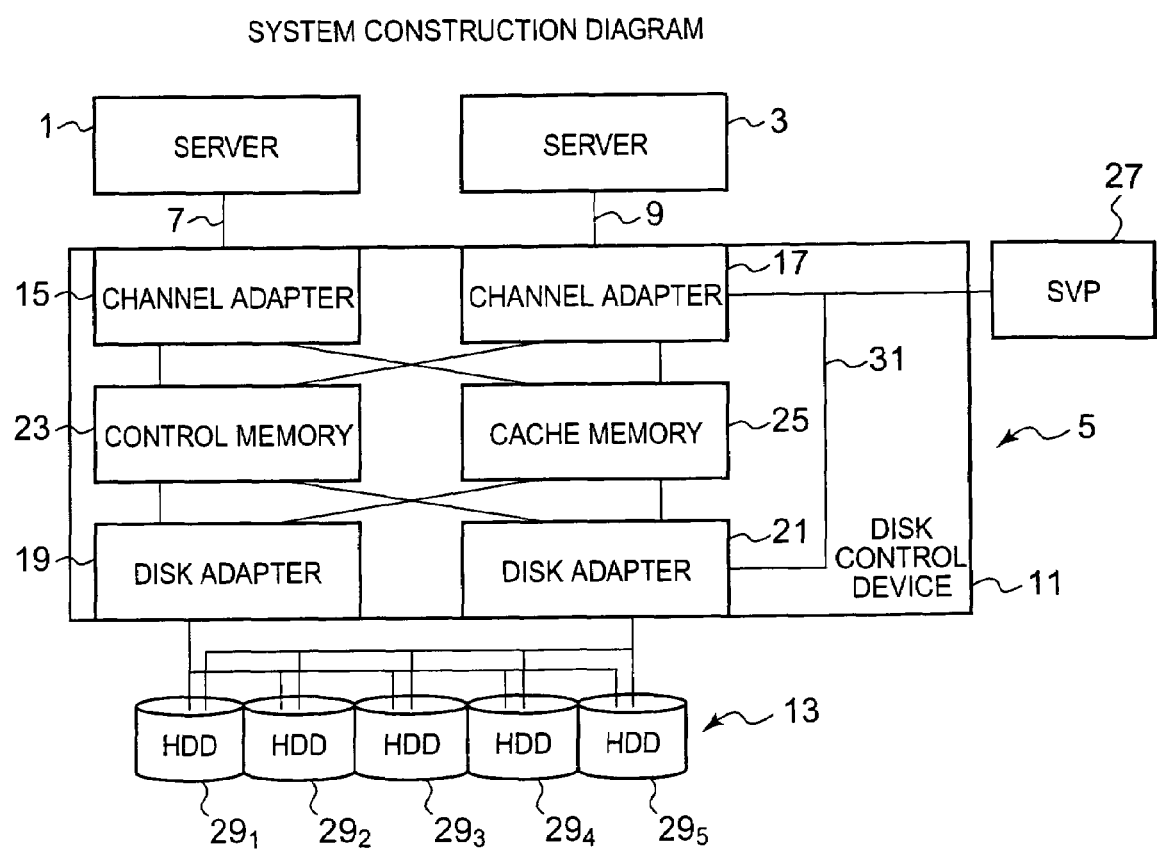
FIG. 1 is a block diagram which shows the overall construction of an information processing system comprising a storage system constituting a first embodiment of he present invention.

In the present invention, as will be described later, when snapshot data of original data stored in a primary logical volume is prepared, either a physical snapshot system (referred to as a "shadow image" for convenience; same below) or a logical snapshot system (referred to as a "quick shadow" for convenience; same below) is used. In the case of a shadow image, data storage regions of a data storage device such as an HDD or the like, i.e., a physical volume (PDEV), must be respectively assigned in a fixed manner to primary (logical) volumes and secondary (logical) volumes, and the primary (logical) volumes and secondary (logical volumes) must be set at the same capacity. Accordingly, for example, in a case where the capacity of the primary (logical) volume is set at 10

GB, the capacity of the secondary (logical) volume must also be set at 10 GB, so that a physical volume (PDEV) data storage region with a combined primary and secondary capacity of 20 GB is required.

Meanwhile, in the case of the quick shadow as well, the data storage region of the physical volume (PDEV) is assigned to primary and secondary (logical) volumes; however, the fixed assignment of the data storage region is to the primary (logical) volume alone. Furthermore, when data for updating use is transmitted from the server side to the primary (logical) volume or secondary (logical) volume, a data storage region with the capacity required for the updating of this data is assigned to the secondary (logical) volume from the data storage region of the physical volume (PDEV), and the data prior to updating is stored in this assigned data storage region. Accordingly, even if the capacity of the primary (logical) volume is set at 10 GB, if the amount of updated data is 1 GB, then 11 GB is sufficient data storage region of the physical volume (PDEV) assigned as the primary (logical) volume and secondary (logical) volume.

Furthermore, cases where a pair consisting of the primary (logical) volume and secondary (logical) volume is formed in the shadow image, all of the data that is stored in the primary (logical) volume is copied into the secondary (logical) volume, and copying of the differential data is performed in the case of re-synchronization. As a result, the copying of unnecessary data occurs. In the case of the quick shadow, on the other hand, only the minimum copying that is required in order to leave the data prior to updating is performed.

If the contents described above are summarized, the quick shadow offers the following advantages compared to the shadow image:

(1) When a subsystem (storage system) is constructed, the capacity that is used when the storage region of a physical volume (PDEV) such as an HDD or the like is used as a data storage region can be reduced.

(2) Since the amount of data that is copied is small, the load on the control processor, physical volume (PDEV) (such as an HDD or the like), data transfer circuits and the like can be reduced.

Embodiments of the present invention will be described in detail below with reference to the attached figures.

FIG. 1 is a block diagram showing the overall construction of an information processing system comprising a storage system which constitutes a first embodiment of the present invention.

In FIG. 1, the host devices, i.e., servers 1 and 3, are computer devices comprising information processing resources such as a CPU, memory and the like. For example, the servers 1 and 3 have information input means such as a keyboard switch, pointing device, microphone or the like (not shown in the figures), and information output means such as a monitor display, speaker or the like (not shown in the figures). Furthermore, for example, the servers 1 and 3 have application programs (not shown in the figures) such as data base software or the like using a storage region provided by a storage system 5, and an adapter (not shown in the figures) used to access the storage system 5 via communications networks 7 and 9.

For example, depending on the case, an LAN (local area network), an SAN (storage area network), the internet, a dedicated circuit, a public circuit or the like can be appropriately used as the communications network 7 that is used to connect the server 1 and storage system 5, and as the communications network 9 that is used to connect the server 3 and the storage system 5. Here, for example, data communications via such an LAN are performed according to a TCP/IP (transmission control protocol/internet protocol). Here, when the servers 1 and 3 are connected to the storage system 5 via an LAN, the servers 1 and 3 request data input and output in file units by designating file names. On the other hand, when the servers 1 and 3 are connected to the storage system 5 and the like via an SAN, the servers 1 and 3 request data input and output with blocks (which are data control units of the storage region provided by a plurality of disk storage devices (disk drives)) as units, according to a fiber channel protocol. When the communications networks 7 and 9 are LANs, the adapter (not shown in the figures) is (for example) a network card for LANs. When the communications networks 7 and 9 are SANs, the adapter (not shown in the figures) is (for example) a host bus adapter (HBA).

For example, the storage system 5 is constructed as a disk array subsystem. However, the present invention is not limited to this; the storage system 5 can also be constructed as a highly functionalized intelligent type fiber channel switch. The storage system 5 can be divided into to main parts, i.e., a controller part (i.e., a disk control device) 11, and a storage device part (i.e., a disk drive device) 13.

The disk control device 11 provides a virtual data storage space called an LDEV (hereafter referred to as a "logical volume") to the servers 1 and 3, and the data stored in the logical volume is stored substantially in one or a plurality of HDD(s) ($29_1$ through $29_5$). For example, the disk control device 11 comprises a plurality of channel adapters (CHAs) 15 and 17 (only two are shown in FIG. 1) and a plurality of disk adapters (DKAs) 19 and 29 (only two are shown in FIG. 1). In addition to the respective parts, the disk control device 11 further comprises a shared memory (SM), i.e., a control memory 23 (only one is shown in FIG. 1) which is mounted on a plurality of cache boards (caches) (not shown in the figures), a cache memory (CM) 25 (only one is shown in FIG. 1), and a service processor (SVP) 27 which is connected (for example) via an LAN.

The respective CHAs 15 and 17 are connected to the servers 1 and 3 via the communications networks 7 and 9; these CHAs 15 and 17 receive commands from the servers 1 and 3, and execute these commands. The respective CHAs 15 and 17 respectively comprise (for example) communications ports (not shown in the figures) that are used to perform data communications between the servers 1 and 3. In addition to the above, the respective CHAs 15 and 17 are respectively constructed as microcomputer systems comprising a CPU, memory and the like, and (for example) interpret and execute various types of commands received from the servers 1 and 3. Network addresses (e.g., IP addresses or WWNs (world wide names)) that are used to discriminate the respective CHAs 15 and 17 are assigned to the respective CHAs 15 and 17, and the CHAs 15 and 17 are devised so that these CHAs 15 and 17 can behave separately as NAS (network attached storage). Specifically, as is shown in FIG. 1, when a plurality of servers (1, 3) are present, the respective CHAs 15 and 17 can separately receive requests from the respective servers (1, 3).

The respective DKAs 19 and 21 control the exchange of data between the CM 25 and the respective HDDs ($29_1$ through $29_5$) by (for example) being connected to a plurality of PDEVs (physical volumes), i.e., HDDs (hard disk drives) in an RAID (redundant array of independent inexpensive disk) construction. Specifically, the respective DKAs 29 and 21 respectively comprise the communications ports (not shown in the figures) required for connection with the respective HDDs ($29_1$ through $29_5$) in the control of the exchange of the data. In addition to the above, the respective DKAs 19 and 21 are constructed as microcomputer systems comprising a CPU, memory and the like, and the CHAs 15 and 17 write data received from the servers 1 and 3 into specified addresses of specified HDDs ($29_1$ through $29_5$) on the basis of requests (write commands) from the servers 1 and 3. Furthermore, the respective DKAs 19 and 21 read out data from specified addresses of specified HDDs ($29_1$ through $29_5$) on the basis of requests (read commands) from the servers 1 and 3, and transmit this data to the servers 1 and 3 via the CHAs 15 and 17.

In cases where the respective DKAs 19 and 21 input or output data with respect to the HDDs ($29_1$ through $29_5$), the respective DKAs 19 and 21 convert logical addresses into physical addresses. Furthermore, in cases where the HDDs ($29_1$ through $29_5$) are controlled in accordance with an RAID, the respective DKAs 19 and 21 perform data access in accordance with the RAID construction.

The SVP 27 is connected to the CHAs 15 and 17 and DKAs 19 and 21 via a shared bus 31, so that the SVP 27 functions as (for example) means for performing various types of settings and referring to information stored in the HDDs ($29_1$ through $29_5$), control memory 23 and CM 25 by the user. The SVP 27 is connected to a control unit (not shown in the figures) which is used to monitor and control the overall operation of the storage system 5 as respective control consoles. The SVP 27 is devised so that this SVP 27 displays trouble information in the storage system 5 transferred from the control unit (not shown in the figures) on a display part (not shown in the figures), and sends instructions for blocking processing of the HDDs ($29_1$ through $29_5$) and the like to the control unit (not shown in the figures).

The CM 25 temporarily stores data received from the servers 1 and 3 by the respective CHAs 15 and 17, data read out by DKAs 19 and 21 from the HDDs ($29_1$ through $29_5$) for transfer to the servers 1 and 3 via the CHAs 15 and 17, and the like.

Control information and the like that is required for respective specified control operations performed by the CHAs 15 and 17 and DKAs 19 and 20 is stored in the SM 23. Furthermore, in addition to work regions being set, various types of tables such as (for example) mapping tables and the like are also stored in the SM 23. For example, not only is volume control information with the construction shown in FIG. 3 stored for the respective logical volumes, but update information with (for example) the construction shown in FIG. 4 is stored in numerous sets in the SM 23. In addition to the above, update information control information with the construction shown in FIG. 5 (for example), and threshold value control information with the construction shown in FIG. 6 (for example), are also stored in the SM 23. The volume control information, update information, update information control information and threshold value control information will be described later.

The disk drive device 13 comprises a plurality of HDDs ($29_1$ through $29_5$). For example, devices such as hard disks, flexible disks, magnetic disks, semiconductor memories, optical disks or the like can be used as the HDDs ($29_1$ through $29_5$).

Figure 2:
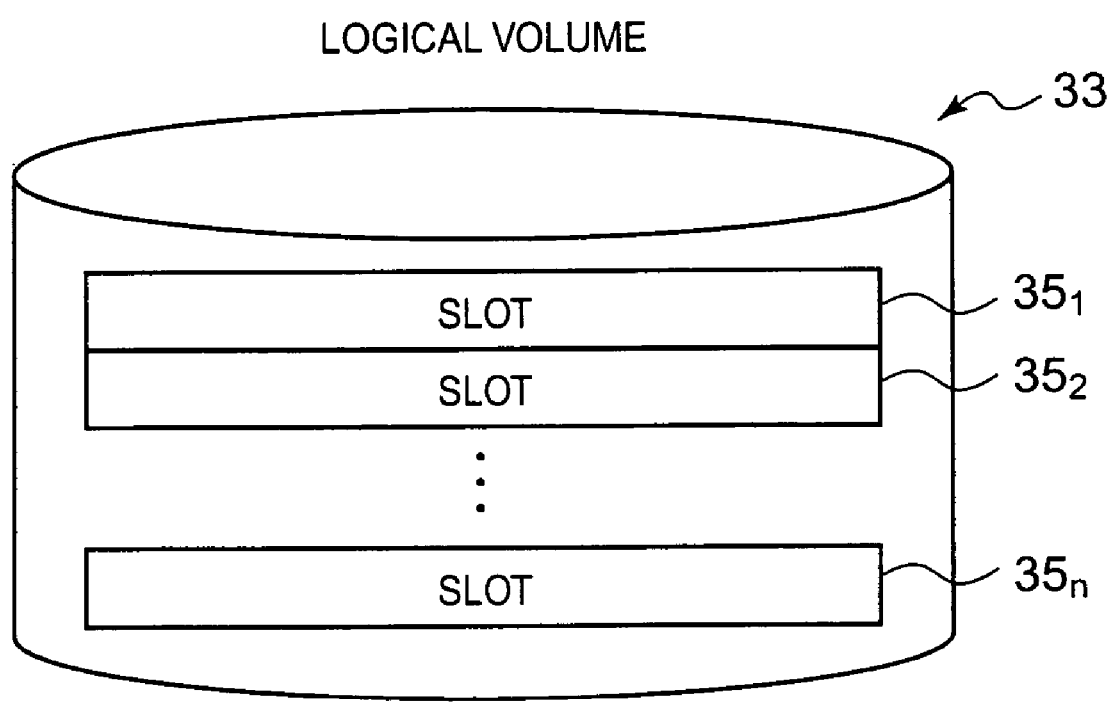
FIG. 2 is an explanatory diagram showing the construction of the logical volume (LDEV) in a first embodiment of the present invention.

FIG. 2 is an explanatory diagram which shows the construction of the logical volume in a first embodiment of the present invention. In actuality, the logical volume shown in FIG. 2 consists of numerous volumes set in the disk drive device 13; however, for convenience of graphic illustration and description, only a single logical volume is shown.

As is shown in FIG. 2, the logical volume 33 is divided into a plurality of regions ($35_1$, $35_2$, ..., $35_n$) called slots by the disk control device 11 shown in FIG. 1, and the respective slots ($35_1$ through $35_n$) are controlled by the disk control device 11.

Figure 3:
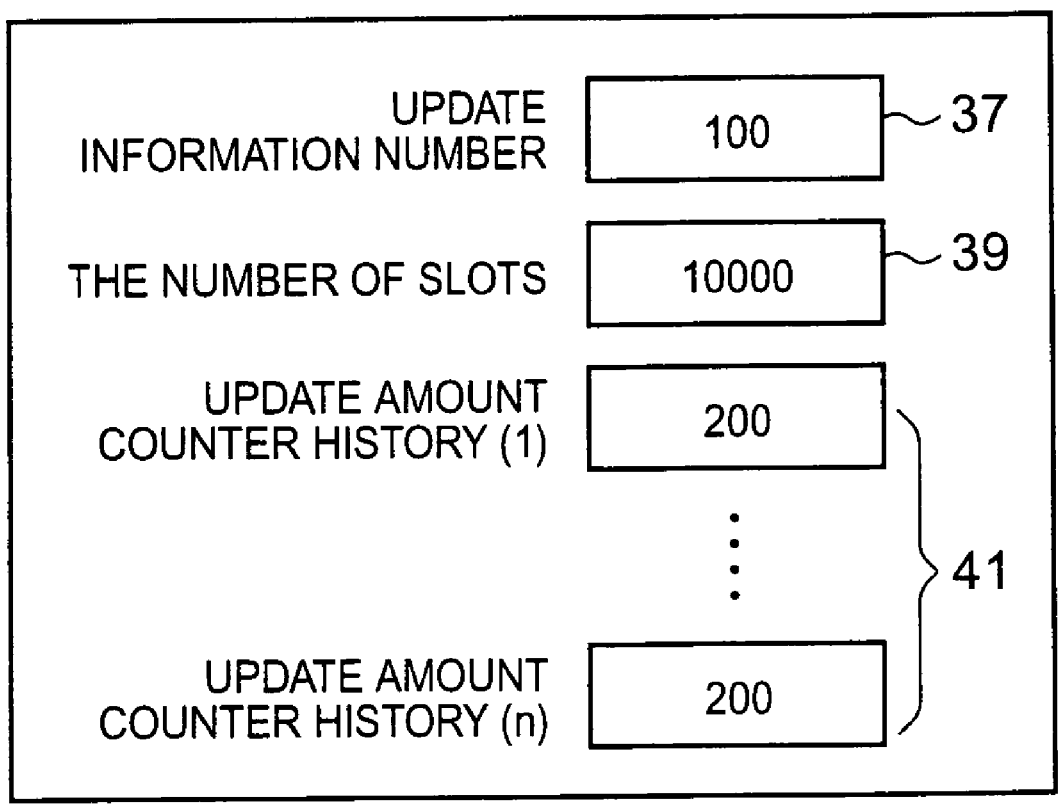
FIG. 3 is an explanatory diagram showing one example of the volume control information that is stored in the control memory of the storage system constituting a first embodiment of the present invention.
Figure 4:
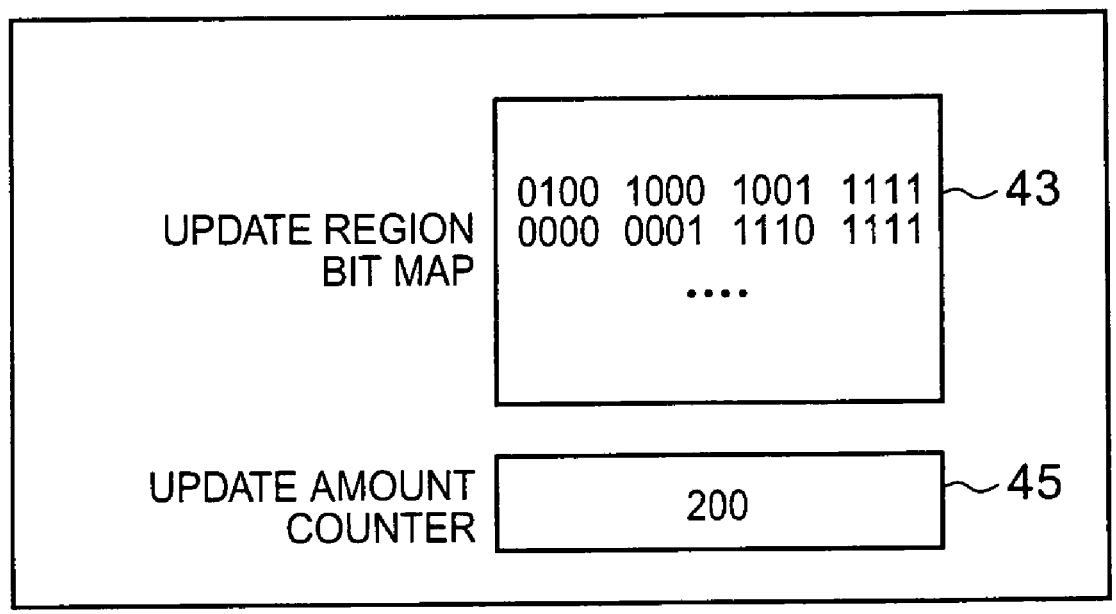
FIG. 4 is an explanatory diagram showing one example of the update information that is stored in the control memory of the storage system constituting a first embodiment of the present invention.

FIG. 3 is an explanatory diagram showing one example of the volume control information that is stored in the control memory 23 of the storage system 5 in the first embodiment of the present invention.

For example, the volume control information shown in FIG. 3 refers to information that is set for each logical volume (33) shown in FIG. 2. Specifically, a number of sets of volume control information equal to the number of logical volumes set in the disk drive device 13 shown in FIG. 1 are present in the control memory 23. As is shown in FIG. 3, an update information number 37, the number of slots 39 and updating amount counter history (1) through (n) 41 are stored in the respective sets of volume control information as information that is used to control the corresponding logical volume (33).

Here, the update information number is a so-called discriminating number that is provided for each individual set of update information in order to discriminate the numerous individual sets of update information that are stored in the control memory 23 shown in FIG. 1. In FIG. 3, the "100" that is recorded as the update information number 37 indicates that a total of 100 sets of update information are stored in the logical volume (33) corresponding to the volume control information shown in FIG. 3.

Next, the "10000" that is stored as the number of slots 39 indicates the number of slots in the logical volume (33) that is set by the disk control device 11 shown in FIG. 1. Furthermore, the "200", ..., "200" stored as the update amount counter histories (1) through (n) 41 all indicate past update amount count values counted by the update amount counter.

The storage regions of the update amount counter histories ((1) through (n)) indicated by the symbol 41 in the control memory 23 are enlarged each time that the disk control device 11 receives a snapshot preparation request from the server 1 (or server 3) via the communications network 7 (or communications network 9), As a result, the update amounts of one generation or a plurality of generations of information can be judged. Furthermore, in regard to the storage regions 41, the system may also be devised so that instead of these regions being enlarged each time that the disk control device 11 receives the snapshot preparation request, storage regions for storing new update amount counter histories ((1) through (n)) are ensured by clearing some of the existing update amount counter histories ((1) through (n)).

FIG. 4 is an explanatory diagram showing one example of the update information that is stored in the control memory 23 of the storage system 5 of the first embodiment of the present invention.

As was described above, numerous sets of update information are stored in the control memory 23; accordingly, the update information is disposed in individual logical volume units that are set inside the disk drive device 13 shown in FIG. 1. Specifically, at the maximum, a number of sets of update information that is the same as the number of the logical volume may be present in the control memory 23. An update information number (shown in FIG. 3 and FIG. 5) that is used to discriminate the respective sets of update information is assigned to the individual sets of update information. As is shown in FIG. 4, the respective sets of update information are constructed from an update region bit map 43 and an update amount counter 45.

As is shown in the figures, the update region bit map 43 is constructed from a plurality of bits, and the respective bits correspond to the slots ($35_1$ through $35_n$) of the logical volume (33) shown in FIG. 2. The respective bits indicate whether or not the data of the slots ($35_1$ through $35_n$) corresponding to these slots has been updated. Specifically, if a given bit is "0", this indicates that the data of the corresponding slot ($35_1$ through $35_n$) has not been updated, while if this bit is "1", this indicates that the data of the corresponding slot ($35_1$ through $35_n$) has been updated.

The update amount counter 45 indicates the number of slots ($35_1$ through $35_n$) in which data has been updated, and holds the number of "1"s in the update region bit map, i.e., the number of slots ($35_1$ through $35_n$) in which data has been updated. In FIG. 4, the count value of the update amount counter 45 is "200"; this indicates that the number of slots ($35_1$ through $35_n$) in which data has been updated is "200".

FIG. 5 is an explanatory diagram showing one example of the update information control information that is stored in the control memory 23 of the storage system 5 in the first embodiment of the present invention.

The update information control information is information which is defined as information that is used to control the update information shown in FIG. 4, i.e., all of the numerous sets of update information (a number of sets of update information that is the same as number of logical volumes (33) set in the disk drive device 13) stored in the control memory 23 of the storage system 5 shown in FIG. 1. Accordingly, as is shown in FIG. 5, the update information control information has a region (update information number) 47 which can record a number of update information numbers corresponding to the number of all of the sets of update information stored in the control memory 23, and a region (use state) 49 which can record all of the use states of the logical volumes (33) corresponding to the respective update information numbers.

In the use state 49, the term "unused" indicates that none of the data stored in any of the slots ($35_1$ through $35_n$) in the corresponding logical volumes (33) has been updated. On the other hand, "in use" indicates that at least one of the slots ($35_1$ through $35_n$) has been updated.

In the example shown in FIG. 5, it is indicated that none of the data in any of the slots ($35_1$ through $35_n$) in the logical volume (33) corresponding to the update information number "0" has been updated, and that in the logical volumes (33) corresponding to the update information number "1" and update information number "2", the data of some of the slots ($35_1$ through $35_n$) has been updated.

Furthermore, the update information control information is used to search for volumes that can form pairs with primary volumes in which original data is stored during snapshot preparation.

FIG. 6 is an explanatory diagram showing one example of the threshold value control information that is stored in the control memory 23 of the storage system 5 in the first embodiment of the present invention.

The threshold value control information is information that is used to control the threshold value that forms the basis for judging whether the physical snapshot system (i.e., shadow image) is to be used, or the logical snapshot system (i.e., quick shadow) is to be used, in the preparation of snapshot data of the original data stored in the primary (logical) volume. Specifically, in a logical volume (33) with an update information number for which it is judged that the use state is "in use" on the basis of the update information control information shown in FIG. 5, a check is made from the number of slots in the volume control information (shown in FIG. 3) corresponding to this logical volume (33), and the update amount count value in the update information (shown in FIG. 4) corresponding to this logical volume (33), as to whether or not the proportion of the number of slots in which data has been updated relative to the total number of slots exceeds the threshold value (%).

If it is judged as a result of this check that the threshold value has been exceeded, then the physical snapshot system (shadow image) is used in the preparation of the snapshot data. On the other hand, if the proportion of the slots in which data has been updated relative to the total number of slots is less than the threshold value (%) in the logical volume (33), then the logical snapshot system (quick shadow) is used in the preparation of the snapshot data.

In the example shown in FIG. 6, the threshold value is set at 50%. Accordingly, in the logical volume (33), if the proportion of the number of slots in which data has been updated relative to the total number of slots exceeds the threshold value (%), the physical snapshot system is used, while if this proportion is less than the threshold value, the logical snapshot system is used.

Furthermore, the threshold value may be determined by default, or may be set at (or changed to) a value desired by the user (through the operation of the keyboard of the SVP 27 (shown in FIG. 1) by the user).

Figure 7:
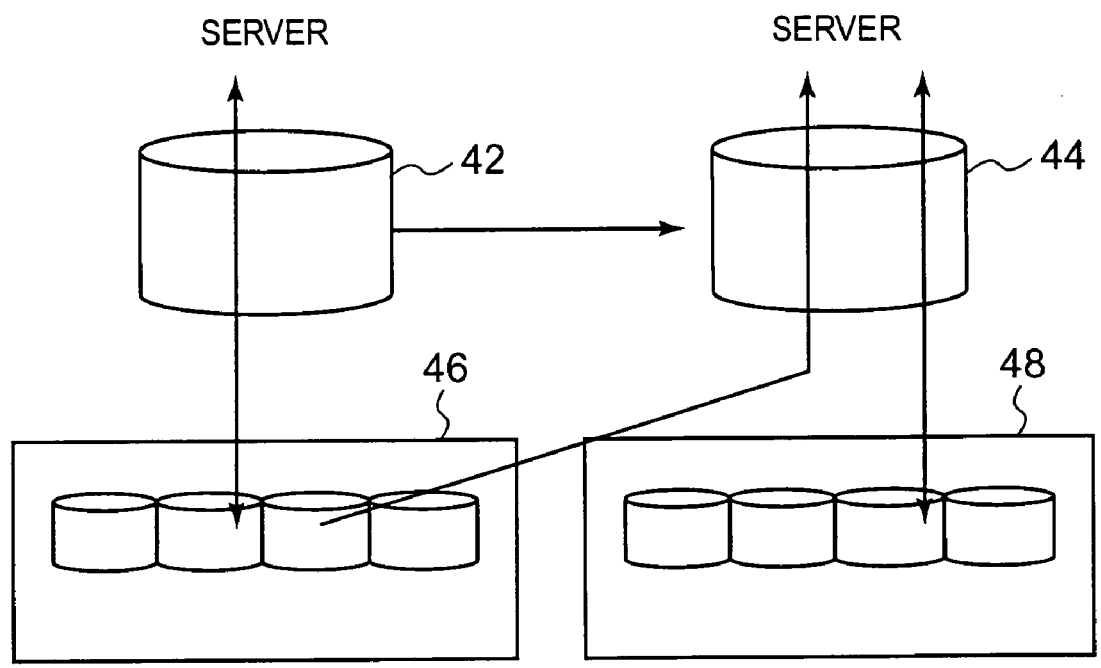
FIG. 7 is an explanatory diagram showing the construction of the logical snapshot used in an information processing system comprising the storage system constituting a first embodiment of the present invention.

FIG. 7 is an explanatory diagram showing the construction of the logical snapshot system used in an information processing system comprising the storage system of the first embodiment of the present invention.

In the logical snapshot system, the data prior to updating is saved rather than the data that has been updated, so that duplicated processing is performed; however, duplicated processing is not performed for data that is not updated.

In FIG. 7, the primary volume 42 is a logical volume that stored original data, and the secondary volume 44 is a logical volume that stores snapshot data of the original data stored in the primary volume 42. Furthermore, the symbol 46 indicates an HDD group that holds data of the primary volume 42 and data of the part of the secondary volume 44 that has not yet been updated, and the symbol 48 indicates an HDD group that holds data prior to updating rather than data following updating.

Figure 8:
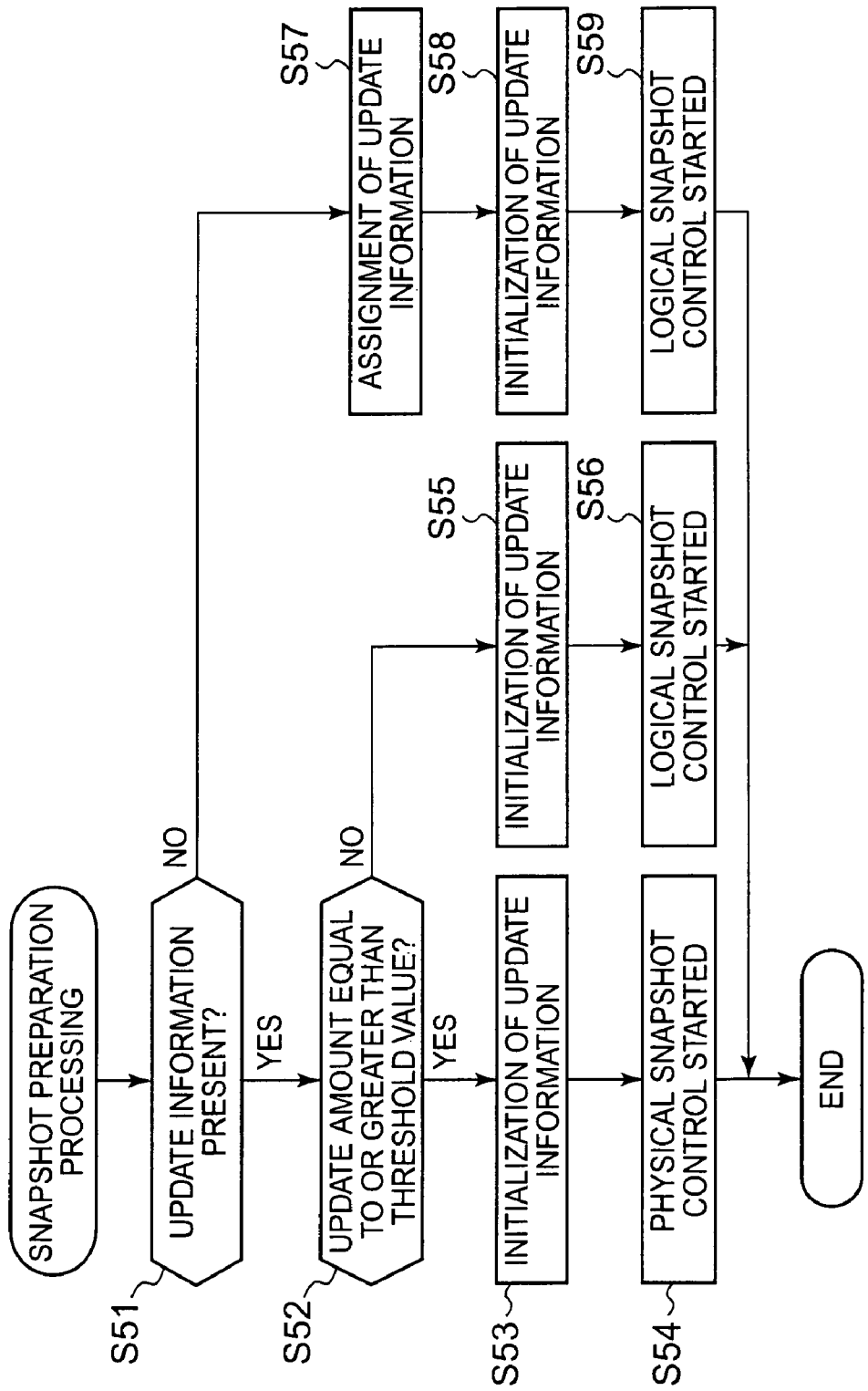
FIG. 8 is a flow chart which shows the procedure of the snapshot data preparation processing that is performed in the storage system constituting a first embodiment of the present invention.

FIG. 8 is a flow chart which shows the procedure of the snapshot data preparation processing that is performed by the storage system 5 of the first embodiment of the present invention.

In FIG. 8, for example, when the disk control device 11 (i.e., the CHA 15 (or 17) of the disk control device 11) receives a snapshot data preparation request from the server 1 (or 3) via the communications network 7 (or 9), the disk control device 11 checks whether or not update information is present in the logical volumes (33) that are the object of snapshot data preparation by making reference to the volume control information (shown in FIG. 3) relating to these logical volumes (33) from the SM 23. Here, the term "logical volumes that are the object of snapshot data preparation" refers to the primary (logical) volume that stores the original data and the logical volume (secondary (logical) volume) that is to store the snapshot data of this original data (step S51).

If it is found as a result of the check that update information is present in the logical volumes (33) that are the object of snapshot data preparation (YES in S51), then a check is made from the number of slots in the volume control information shown in FIG. 3 and the update amount count value in the update information shown in FIG. 4 as to whether or not the proportion (%) of the update amount relative to the number of slots is equal to or greater than the threshold value (50%) in the threshold value control information shown in FIG. 6 (step S52). If it is found as a result of this check that the proportion of the update amount relative to the number of slots is equal to or greater than the threshold value (YES in step S52), then initialization of the update information shown in FIG. 4 is performed; i.e., the update region bit map 43 in the update information and the update amount counter 45 are initialized (step S53), physical snapshot control is started (step S54), and the series of processing operations is ended.

On the other hand, in cases where the proportion of the update amount relative to the number of slots is not equal to or greater than the threshold value (NO in step S52), the initialization of the update information shown in FIG. 4 is performed (step S55) in the same manner as in step S53, logical snapshot control is started (step S56), and the series of processing operations is ended.

Furthermore, if update information is not present in the logical volumes (33) that are the object of snapshot data preparation (NO in step S51), then reference is made to the update information control information shown in FIG. 5, and a search is made for update information (shown in FIG. 4) that is considered "unused" in this control information (step S57). Then, in the same manner as in step S53 and step S55, initialization of the update information that is found is performed (step S58), logical snapshot control is started (step S59) in the same manner as in step S56, and the series of processing operations is ended.

Figure 9:
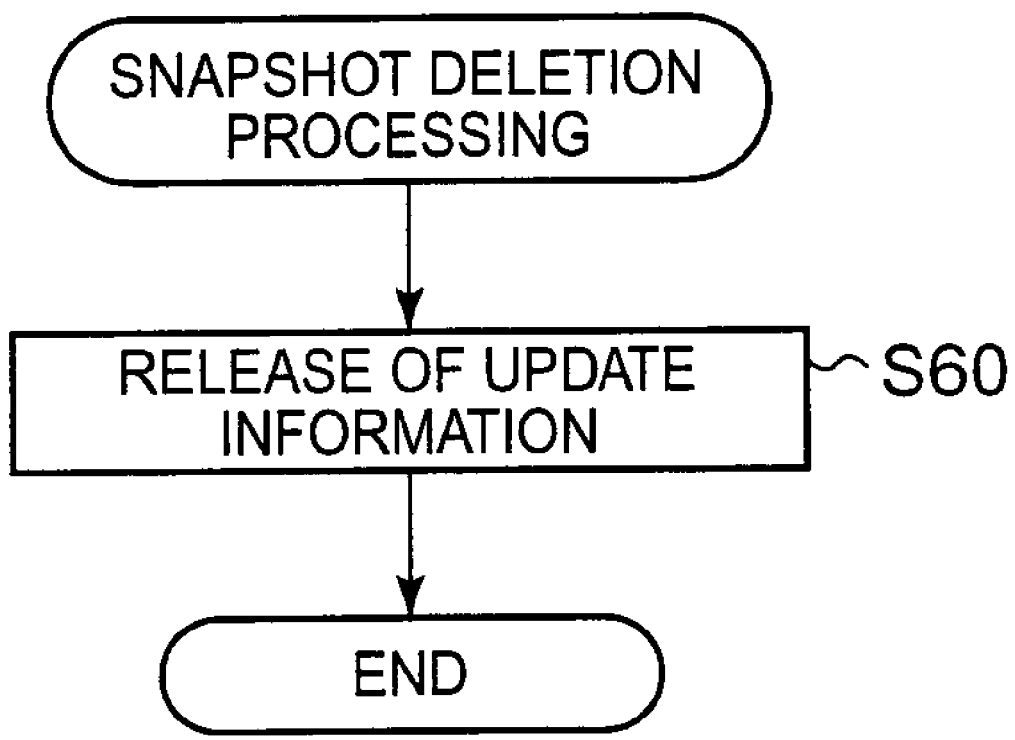
FIG. 9 is a flow chart which shows the procedure of the snapshot data deletion processing that is performed in the storage system constituting a first embodiment of the present invention.

FIG. 9 is a flow chart which shows the procedure of the snapshot data deletion processing that is performed by the storage system 5 of the first embodiment of the present invention.

In the flow chart shown in FIG. 9, deletion processing of the snapshot data prepared via the procedure of the snapshot data preparation processing shown in FIG. 8 is performed. Specifically, when a snapshot data deletion request is transmitted from the server 1 (or 3) via the communications network 7 (or 9), this deletion request is received by the disk control device 11 (i.e., the CHA 15 (or 17) of the disk control device 11). Then, for example, the use state of the update information of the logical volumes (33) that are the object of snapshot data deletion, i.e., the respective update information of the primary (logical) volume storing the original data and the logical volume (secondary (logical) volume) snapshot data of this original data, is changed from "in use" to "unused".

In other words, the use state of the update information corresponding to the logical volumes (33) that are the object of deletion among the update information control information shown in FIG. 5 (as was already described above, this update information can be discriminated by means of the update information number 47 shown in FIG. 5) is changed from "in use" to "unused" by the disk control device 11. As a result, the logical volumes (33) that are the object of deletion are released from snapshot control (step S60), and the deletion processing of the snapshot data is ended.

Figure 10:
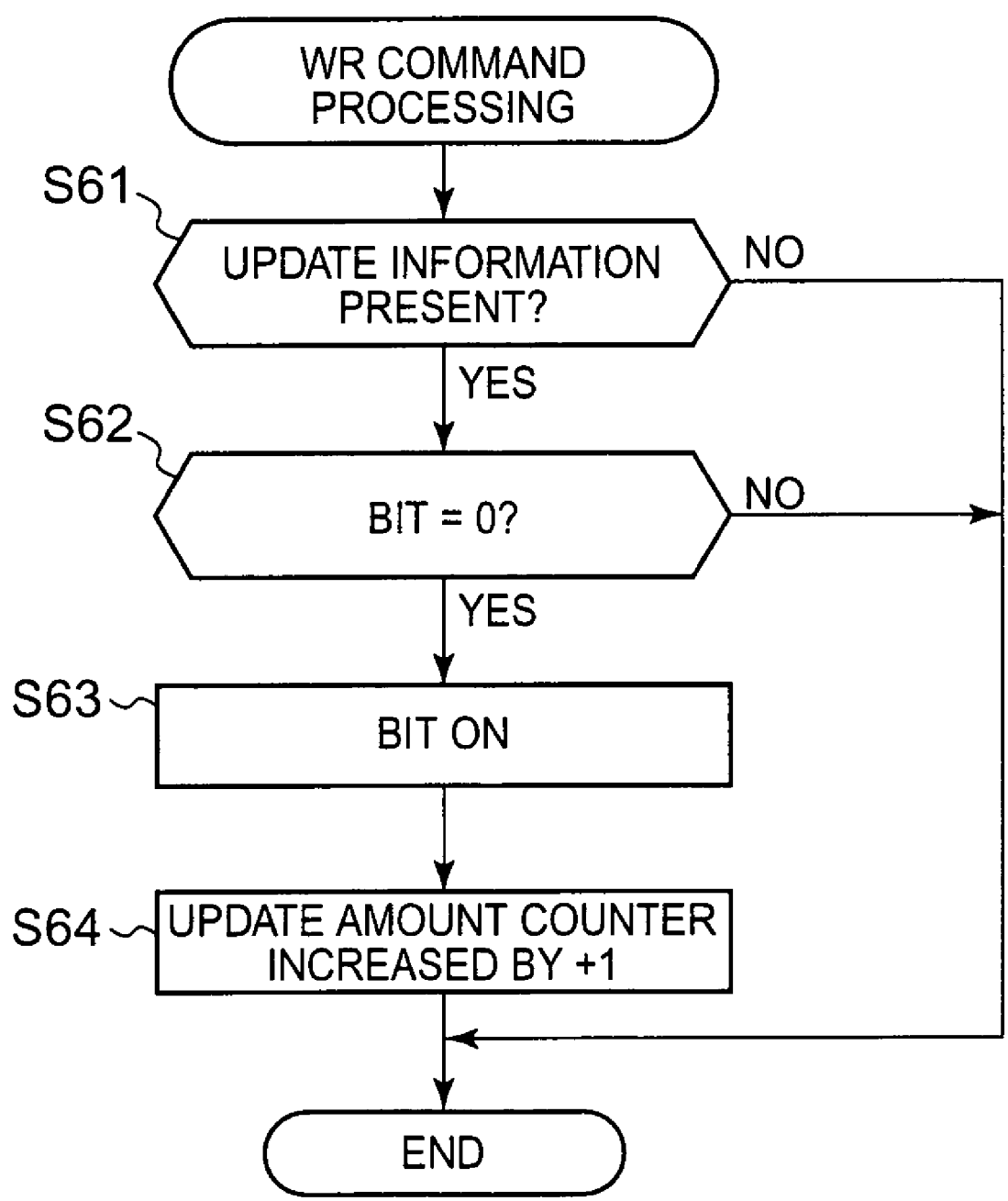
FIG. 10 is a flow chart which shows the procedure of the WR command processing that is performed in the storage system constituting a first embodiment of the present invention.

FIG. 10 is a flow chart which shows the procedure of the WR (write) command processing that is performed by the storage system 5 of the first embodiment of the present invention.

In FIG. 10, when a WR command is transmitted from the server 1 (or 3) via the communications network 7 (or 9), the disk control device 11 (i.e., the CHA 15 (or 17) of the disk control device 11) receives this WR command. Then, a search is made of the volume control information that is set for each logical volume (33) shown in FIG. 3, so that a check is made as to whether or not update information is present in the logical volume (33) that is the object of the issuance of the WR command (step S61).

If it is found as a result of the check that such update information is present (YES in step S61), a check is made as to whether or not the bit of the slot that is the object of the WR command is "0" from the update region bit map 43 for the update information corresponding to the logical volume (33) among the update information shown in FIG. 4 (step S62). If it is found as a result of the check that the bit of the object slot of the WR command is "0" (YES in step S62), updating of the data in the object slot by the (write) data relating to the WR command is newly performed. Consequently, the bit is set as "1" (step S63), +1 is added to the update amount counter 45 shown in FIG. 4 (step S64), and the series of WR command processing operations is ended.

In cases where update information is not present in step S61 (NO in step S61), and in cases where the bit of the object slot of the WR command is not "0" in step S62 (NO in step S62), the series of WR command processing operations is immediately ended.

In the first embodiment of the present invention, as was described above, the logical snapshot system is used when it is judged that the amount of updated data of the original data stored in the primary (logical) volume during snapshot data preparation in the storage system 5 is small, and the physical snapshot system is used when it is judged that the amount of updated data is large. Accordingly, abnormal ending of the snapshot data preparation processing as a result of the pool region (which is a data space used to save data prior to updating) becoming filled with saved data from the primary (logical) volume can be prevented.

In the logical snapshot system, as was described above, the same data is shared by primary (logical) volumes and secondary (logical) volumes. Accordingly, when so-called blocking (HDD duplex trouble) occurs in a primary (logical) volume, blocking also occurs simultaneously in the secondary (logical) volume that forms a pair with the primary (logical) volume in which this blocking has occurred; as a result, there is a danger that not only the data that is in used, but also the backup data, will be lost.

Accordingly, in view of the above, a second embodiment of the present invention (described below) has been proposed.

Figure 11:
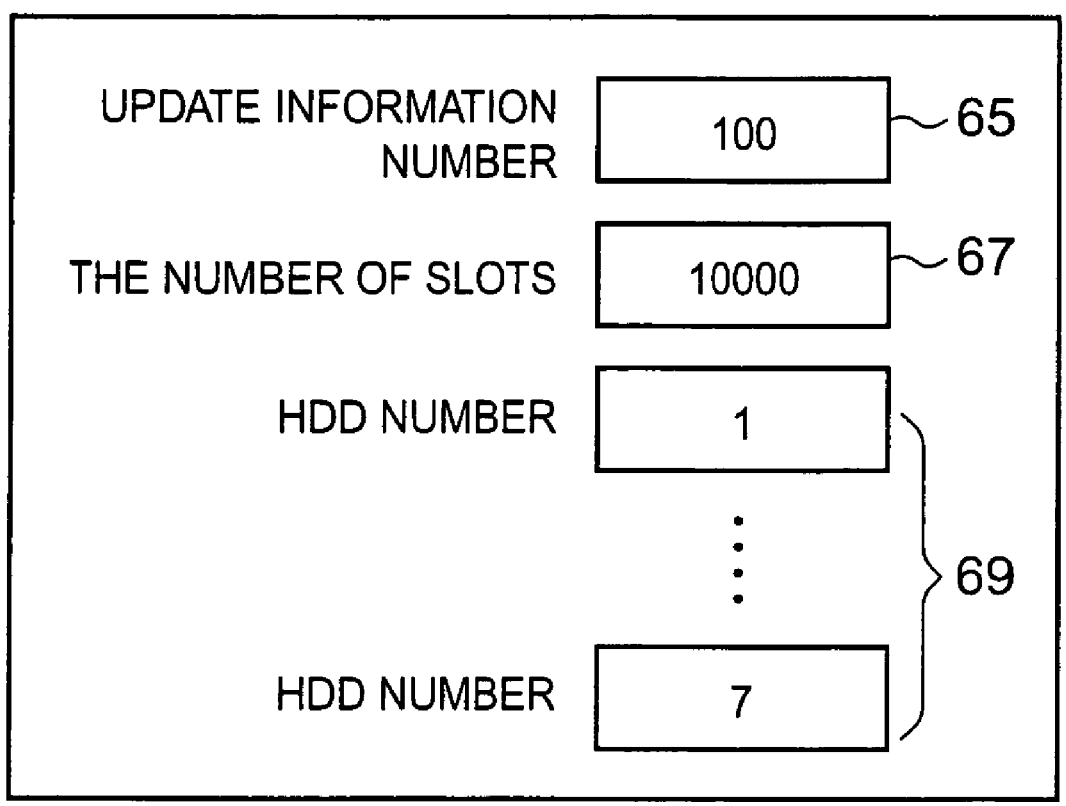
FIG. 11 is an explanatory diagram showing one example of the volume control information that is stored in the control memory of the storage system constituting a second embodiment of the present invention.

FIG. 11 is an explanatory diagram showing one example of the volume control information that is stored in the control memory (23) of the storage system 5 of the second embodiment of the present invention. Furthermore, the storage system in this embodiment, and the information processing system comprising this storage system, have the same construction as the storage system of the first embodiment of the present invention shown in FIG. 1, and the information processing system comprising this storage system. Accordingly, a graphic illustration and detailed description of the storage system in this embodiment, and of the information processing system comprising this storage system, are omitted.

In the present embodiment, the volume control information shown in FIG. 11 differs from the volume control information shown in FIG. 3 in that an HDD number 69 is stored instead of the update amount counter history (1) through update amount counter history (n) 41 shown in FIG. 3, along with the update information number 65 and the number of slots 67. The HDD number 69 is a number that is used to discriminate one or a plurality of HDDs that constitute a specified logical volume (33) corresponding to the volume control information. In other words, the HDD number 69 is information that is used to discriminate one or a plurality of HDbs that actually store data assigned to a specified logical volume (33) that corresponds to the volume control information. Furthermore, a detailed description of the update information number and the number of slots is omitted.

FIG. 12 is an explanatory diagram showing one example of the HDD control information that is stored (in a plurality of sets) in the control memory (23) of the storage system (5) of the second embodiment of the present invention.

For example, the HDD control information is information that is used to control the HDDs 29, through 29₅ shown in FIG. 1, and is set for each of the HDDs (29₁ through 29₅). The HDD control information has a region (state) 71 that is used to record the state of each HDD, a region (correctable error frequency) 73 that is used to record the number of times of occurrence of correctable errors, and a region (uncorrectable error frequency) 75 that is used to record the number of times of occurrence of uncorrectable errors. "Normal", which indicates that the corresponding HDD is capable of RD (READ)/WR, or "abnormal", which indicates that the corresponding HDD is incapable of RD/WR, is recorded in the state 71. The correctable error frequency 73 is contained in information that is picked up from the HDD corresponding to the HDD control information by the DKC (19 or 21) of the disk control device 11. Furthermore, like the correctable error frequency 73, the uncorrectable error frequency 75 is also contained in information that is picked up from the HDD corresponding to the HDD control information by the DKC (19 or 21) of the disk control device 11.

In the HDD control information, the information respectively recorded as the state 71, correctable error frequency 73 and uncorrectable error frequency 75 is all reset whenever the HDDs corresponding to this HDD control information are replaced.

Figure 13:
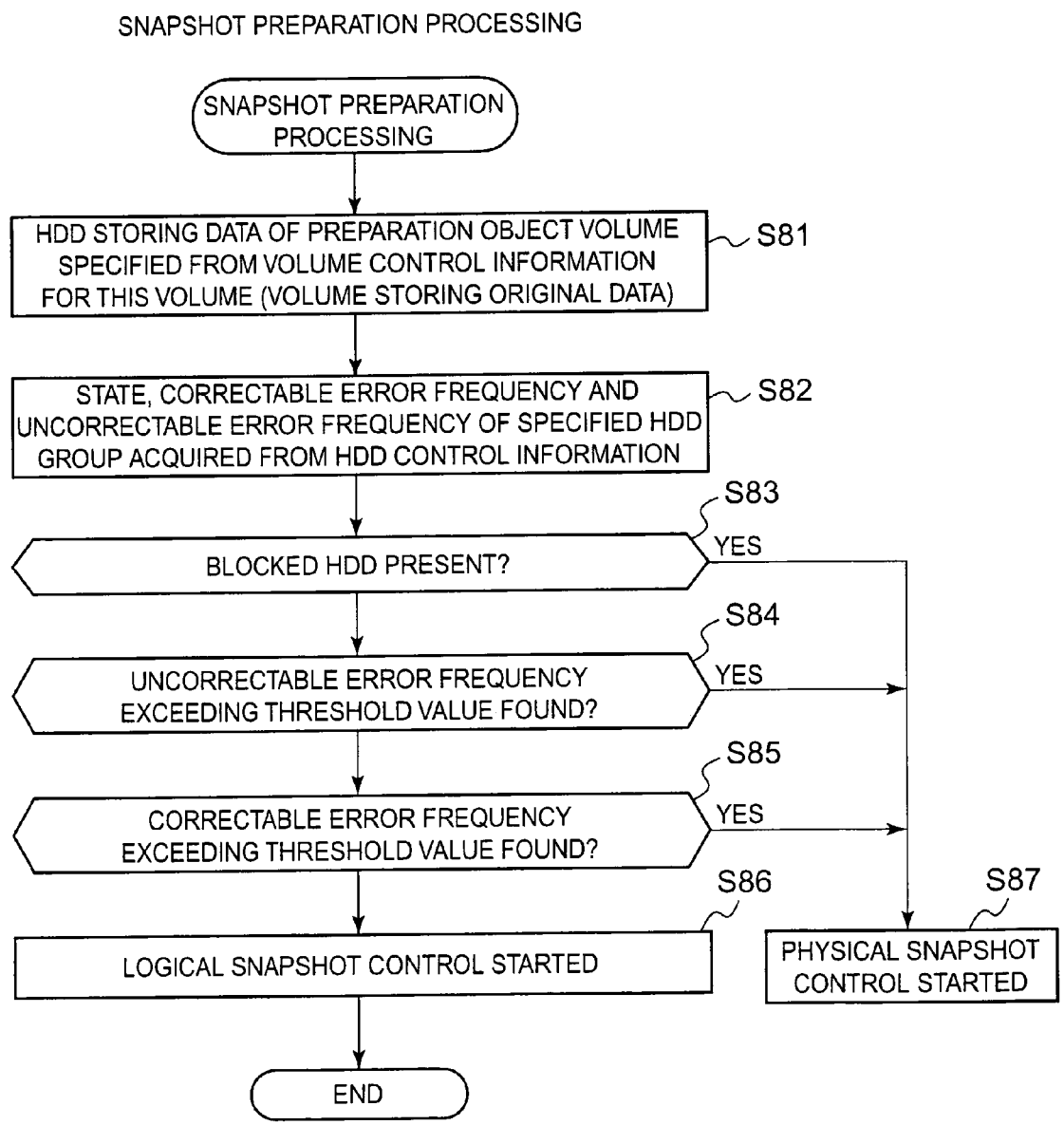
FIG. 13 is a flow chart which shows the procedure of the snapshot data preparation processing that is performed in the storage system constituting a second embodiment of the present invention.

FIG. 13 is a flow chart which shows the procedure of the snapshot data preparation processing that is performed by the storage system (5) of the second embodiment of the present invention. In the snapshot data preparation processing shown in FIG. 13, the collection of snapshot data is performed by the physical snapshot system when it is judged that the reliability is low as a result of the evaluation of the reliability of the HDD group holding the original data (of the snapshot data).

In FIG. 13, when a snapshot data preparation request is transmitted from the server (1 or 3) via the communications network (7 or 9), the disk control device (11) (i.e., the CHA (15 or 17) of the disk control device (11)) receives this preparation request. Then, for example, reference is made to the volume control information (shown in FIG. 10) and the like relating to the logical volumes (33) that are the object of snapshot data preparation (from the SM (23)), so that the HDD numbers are uniformly acquired from this volume control information. As a result, the one or plurality of HDDs (29₁ through 29₅) that actually store the data assigned to the logical volumes (33) are specified (step S81). Here, the term "logical volumes that are the object of snapshot data preparation" refers to the primary (logical) volume that stores the original data and the logical volume (secondary (logical) volume) that is to store the snapshot data of this original data, as was described in FIG. 8.

Next, the states, correctable error frequencies and uncorrectable error frequencies of the specified one or plurality of HDD (groups) are acquired from the respective sets of HDD control information by making reference to the respective sets of HDD control information from the SM (23) (step S82). Then, a check is made in order to ascertain whether or not the respective HDDs are blocked (i.e., have failed) HDDs (step S83). If it is ascertained as a result of this check that there are no blocked HDDs (NO in step S83), a check is next made in order to ascertain whether or not there are any HDDs in which the uncorrectable error frequency number exceeds a specified threshold value (step S84). If it is found as a result of this check that there are no HDDs in which the uncorrectable error frequency exceeds the specified threshold value (NO in step S84), a check is next made in order to ascertain whether or not there are any HDDs in which the correctable error number exceeds a specified threshold value (step S85).

If it is found as a result of this check that there are no HDDs in which the correctable error number exceeds the specified threshold value (NO in step S85), it is judged that the HDD reliability is still high, logical snapshot control is initiated (step S86), and the series of processing operations is ended.

Furthermore, in step S84, the fact of whether or not the uncorrectable error frequency exceeds the specified threshold value, and the fact of whether or not the correctable error frequency exceeds the specified threshold value, serves as indicators that indicate the conditions of HDD failure.

When there are blocked HDDs in step S83 (YES in step S83), when there are HDDs in which the uncorrectable error frequency exceeds the specified threshold value in step S84 (YES in step S84), and when there are HDDs in which the correctable error frequency exceeds the specified threshold value in step S85 (YES in step S85), physical snapshot control is immediately initiated (step S87), and the series of processing operations is ended.

Furthermore, default values can be used as the threshold value in step S84 and the threshold value in step S85, or values set by the user can be used.

In the second embodiment of the present invention, as was described above, the physical snapshot system is used for snapshot data preparation when it is judged that the blockage rate (trouble occurrence rate) in the primary (logical) volume is high, and the logical snapshot system is used when it is judged that this is not so. Accordingly, the loss of not only data that is in use but also of backup data can be prevented in the storage system 5.

In the logical snapshot system, the same data is shared by the primary (logical) volume and secondary (logical) volume. Accordingly, when the primary (logical) volume and secondary (logical) volume are simultaneously accessed by the servers (1, 3) which are the higher-level devices of the storage system 5, competition occurs mainly in the HDDs (29₁ through 29₅); as a result, the following problem arises: namely, the host response (i.e., the response from the storage system 5 to the access from the servers (1, 3) constituting the higher-level devices) deteriorates.

Accordingly, in view of the above, a third embodiment of the present invention (described below) has been proposed.

Figure 14:
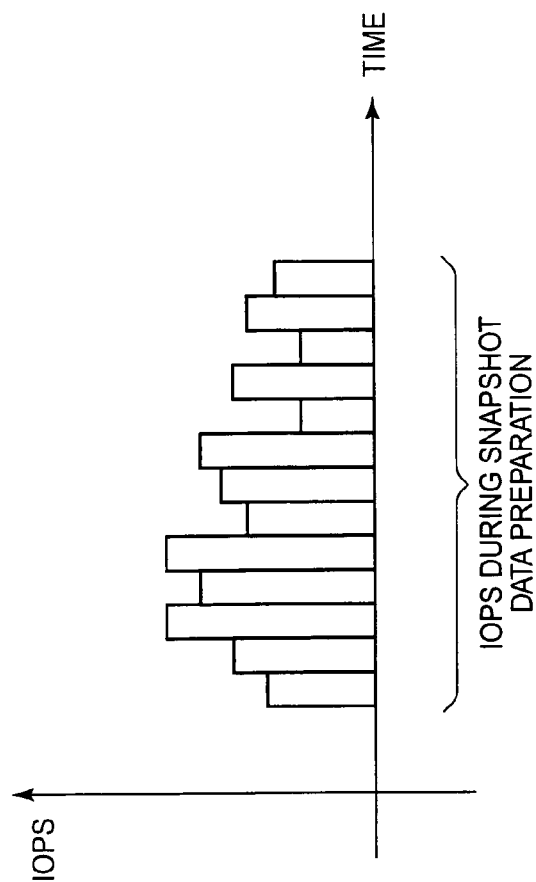
FIG. 14 is an explanatory diagram showing one example of the volume control information that is stored in the control memory of the storage system constituting a third embodiment of the present invention.

FIG. 14 is an explanatory diagram showing one example of the volume control information that is stored in the control memory (23) of the storage system (5) of the third embodiment of the present invention. Furthermore, the storage system in the present embodiment, and the information processing system comprising this storage system, have the same construction as the storage system of the first embodiment of the present invention shown in FIG. 1, and the information processing system comprising this storage system. Accordingly, a graphic illustration and detailed description of the storage system in the present embodiment, and of the information processing system comprising this storage system, are omitted.

In the present embodiment, the volume control information shown in FIG. 14 differs from the volume control information shown in FIG. 3 and the volume control information shown in FIG. 11 in that an I/O counter 93, a current counter 95 and an acquisition starting time 97 are stored instead of the update amount counter history (1) through update amount counter history (n) 41 shown in FIG. 3 and the HDD number 69 shown in FIG. 11, along with the update information number 89 and the number of slots 91.

The volume control information shown in FIG. 14 holds a plurality of regions required in order to count the number of I/Os (i.e., the number of commands from the servers 1, 3 constituting the higher-level devices) per unit time (e.g., per hour), and controls the extent to which such I/Os are performed. In other words, as is shown in FIG. 14, the volume control information is used to produce the IOPS (IOPS refers to the number of I/Os processed per second, and is one unit indicating the processing capacity of the storage system) during snapshot data preparation.

The I/O counter 93 counts the commands from the higher-level devices (servers 1 and 3), and is cleared (initialized) each time that the CHA receives a snapshot data preparation requested from a higher-level device (server 1 or 3). For example, the current counter 95 starts in synchronization with the starting of the I/O counter 93 that starts first among a plurality of I/O counters 93, and holds a numerical value that indicates which of the I/O counters 93 is currently performing a counting operation. When the I/O counter 93 that is performing a counting operation switched to the next I/O counter 93, the current counter 95 also switches the held numerical value to a numerical value indicating the I/O counter 93 that is next performing the counting operation. The acquisition starting time 97 indicates the time at which the acquisition of snapshot data is initiated.

The IOPS during snapshot data preparation shown in the figures is produced on the basis of the count value that is output from the I/O counter 93.

FIG. 15 is an explanatory diagram which shows the magnitude of the load in the HDD group that actually holds the data assigned to the primary (logical) volume in the storage system (5) of the third embodiment of the present invention.

In FIG. 15, the magnitude of the load in the HDD group that actually holds the data assigned to the primary volume shown in FIG. 15 (C) is determined by synthesizing the history of the IOPS of the primary (logical) volume shown in FIG. 15 (A), which is the IOPS during snapshot data preparation, and the history of the IOPS of the secondary volume shown in FIG. 15 (B), which is similarly the IOPS during snapshot data preparation. In other words, the magnitude of the load in the HDD group actually holding the data assigned to the primary volume is calculated from the count value of the I/O counter 93 held in the volume control information shown in FIG. 14; if the magnitude of this load is smaller than a specified threshold value, logical snapshot control is initiated, while if the magnitude of this load is equal to or greater than the threshold value, physical snapshot control is initiated.

In the third embodiment of the present invention, as was described above, when the primary (logical) volume and secondary (logical) volume are simultaneously accessed by the servers (1, 3) during snapshot data preparation, the physical snapshot system is used if it is judged that the rate of competition among the HDDs ($29_1$ through $29_5$) is high, and the physical snapshot system is used if it is judged that this is not so. Accordingly, deterioration of the host response in the storage system 5 can be prevented.

In the case of the physical snapshot system, as has already been described, the following problem arises: namely, the pool region which is a data space that is used to save data prior to updating among the original data that is stored in the primary (logical) volume may become filled with saved data from the primary (logical) volume so that the snapshot data preparation processing ends abnormally, Accordingly, in view of the above, a fourth embodiment of the present invention (described below) has been proposed.

Figure 16:
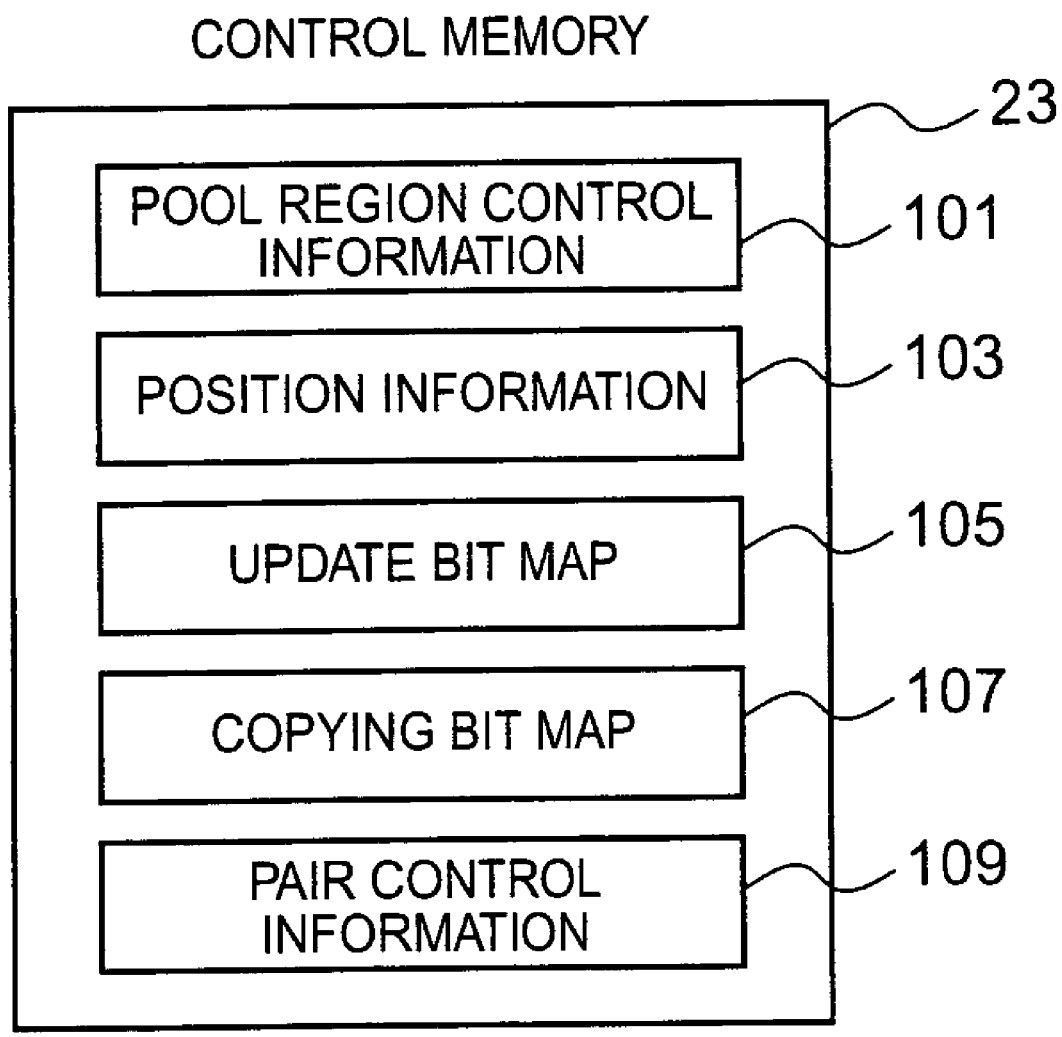
FIG. 16 is an explanatory diagram showing the types of information that are stored in the control memory of a storage system constituting a fourth embodiment of the present invention.

FIG. 16 is an explanatory diagram showing the types of information stored in the control memory (23) of the storage system (5) of this fourth embodiment of the present invention.

As is shown in FIG. 16, pool region control information 101, position information 103, an update bit map 105, a copying bit map 107 and pair control information 109 are stored in the control memory (23). The pool region control information 101 consists of a plurality of sets of information set in accordance with the number of pool regions (in correspondence with each pool region) in pool region units. The position information 103 consists of a plurality of sets of information set in accordance with the number of (logical) volumes (33) (in correspondence with the respective logical volumes) in (logical) volume 33 units.

The update bit map 105 consists of a plurality of sets of information set in accordance with the number of pairs (in correspondence with the respective pairs) in units of the pairs of primary (logical) volumes and secondary (logical) volumes that are formed in the disk drive device (13). Like the update bit map 105, the copying bit map 107 also consists of a plurality of set of information set in accordance with the number of pairs (in correspondence with the respective pairs) in units of the pairs. Furthermore, like the update bit map 105 and copying bit map 107, the pair control information 109 also consists of a plurality of sets of information set in accordance with the number of pairs (in correspondence with the respective pairs) in units of the pairs.

Figure 17:
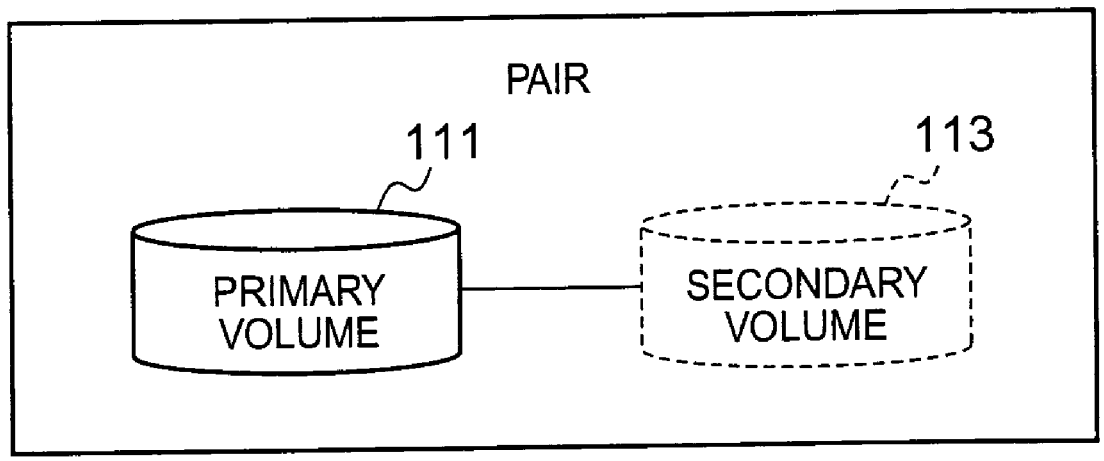
FIG. 17 is an explanatory diagram relating to pairs of primary (logical) volumes and secondary (logical) volumes formed in the disk drive device of the storage system.
Figure 18:
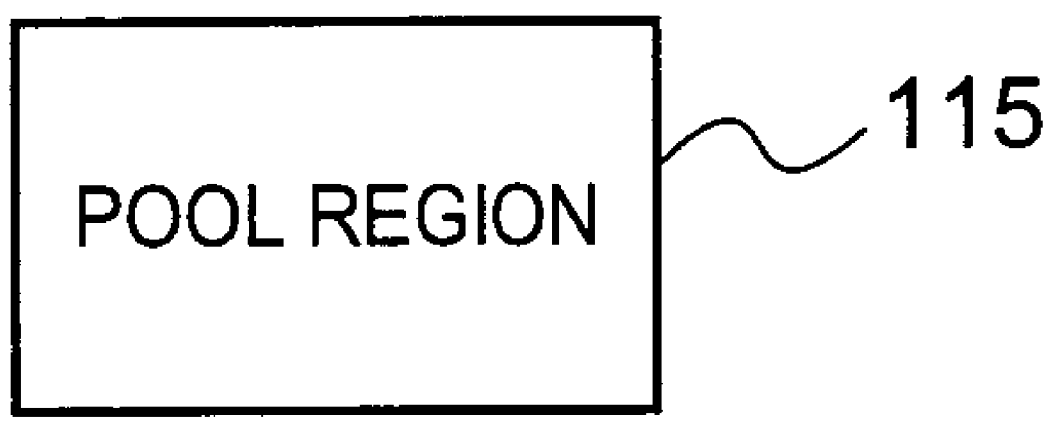
FIG. 18 is a diagram showing the pool region constructed from one or a plurality of (logical) volumes.

FIG. 17 is an explanatory diagram relating to the pairs of primary (logical) volumes and secondary (logical) volumes that are formed in the disk drive device (13) of the storage system (5), and FIG. 18 is a diagram which shows the pool region constructed from one or a plurality of (logical) volumes.

In FIG. 17, the primary (logical) volume 111 is (for example) a volume that stores data used in on-line business; as is clear from the content already described, a data storage space dedicated to this primary (logical) volume (in concrete terms, HDDs ($29_1$ through $29_5$) or the like) is assigned. The secondary (logical) volume 113 is a volume which stores snapshot data of the original data that is stored in the primary (logical) volume (111) that forms a pair with this secondary (logical) volume (113); no data storage space that stores data is assigned in this case. When a need arises for the secondary (logical) volume 113 to store data that is specific to the secondary (logical) volume 113, an unused portion of the pool region is assigned, and data specific to the secondary (logical) volume 113 is stored in this unused portion of the pool region.

The pool region 115 shown in FIG. 18 is a space that is used to store data, and is constructed from one or a plurality of (logical) volumes (33).

Figure 19:
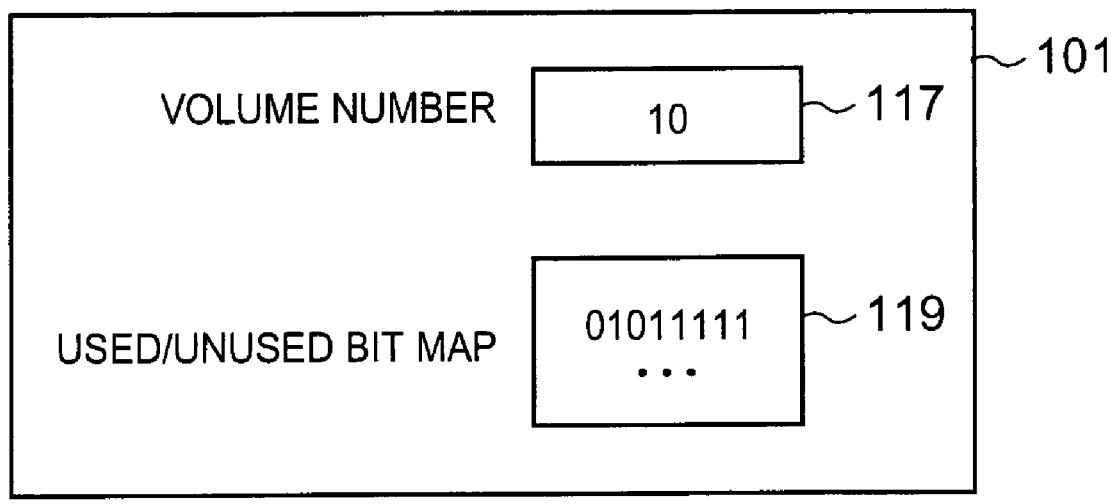
FIG. 19 is an explanatory diagram showing one example of the pool region control information shown in FIG. 16.

FIG. 19 is an explanatory diagram showing one example of the pool region control information 101 shown in FIG. 16.

In FIG. 19, the pool region control information 101 is information that is used to control a pool region (115) that stores data specific to the secondary (logical) volume (113), and includes two types of information, i.e., a volume number 117, and a used/unused bit map 119. The volume number 117 is a number that is assigned to each logical volume (33) in order to discriminate a plurality of logical volumes (33) that are set in the disk drive device (13).

As is shown in the figures, the used/unused bit map 119 is constructed from a plurality of bits, with the respective bits corresponding to the respective slots ($35_1$ through $35_n$) of the logical volume (33) shown in FIG. 2. The respective bits indicate whether or not the data in the slots ($35_1$ through $35_n$) corresponding to these bits has been updated. Specifically, if a given bit is "0", this indicates that the data of the corresponding slot (one of the slots $35_1$ through $35_n$) has not been updated. On the other hand, if this bit is "1", this indicates that the data of the corresponding slot (one of the slots $35_1$ through $35_n$) has been updated.

As has already been described, one pool region (115) is constructed from one or a plurality of (logical) volumes (33).

Accordingly, one pool region (115) is controlled by one or a plurality of sets of pool region control information (101).

FIG. 20 is an explanatory diagram showing one example of the position information 103 shown in FIG. 16.

In FIG. 20, the position information 103 is information that is used to control where the data assigned to a (logical) volume is actually stored; this position information 103 includes three types of information, i.e., a secondary (logical) volume slot number 121, a (logical) volume number 123, and a slot number 125. In the example shown in FIG. 20, it is indicated that the data assigned to a slot number of "0" in the secondary (logical) volume is stored in a slot to which the slot number of "100" is assigned in the (logical) volume to which a volume number of "1" is assigned. Furthermore, it is indicated that the data assigned to a slot number of "1" in the secondary (logical) volume is stored in a slot to which the slot number of "100" is assigned in the (logical) volume to which a volume number of "3" is assigned.

Figure 21:
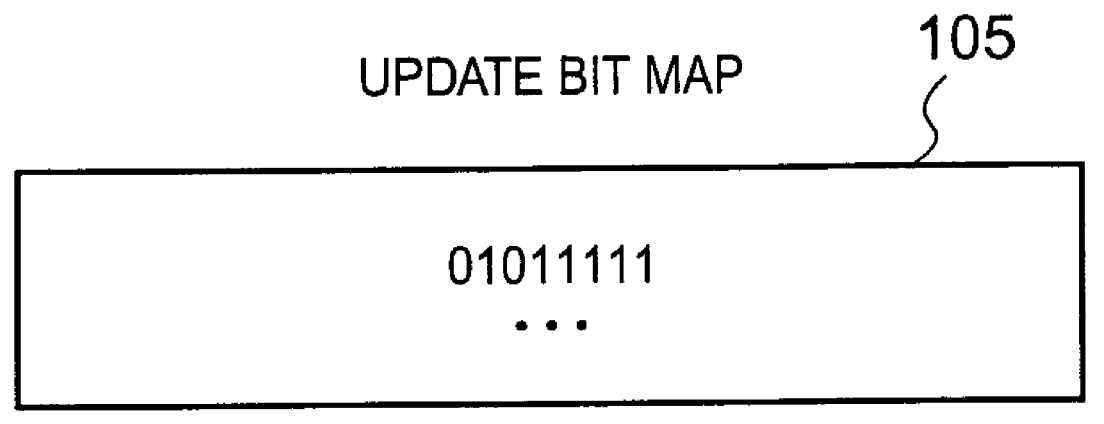

FIG. 21 is an explanatory diagram showing one example of the update bit map 105 shown in FIG. 16.

In FIG. 21, the update bit map 105 shows whether or not the updating of data has been performed in the primary (logical) volume or secondary (logical) volume after following the reception of a snapshot preparation command from the server (1 or 3) by the disk control device (11) (i.e., the CHA (15 or 17) of the disk control device (11)). A bit of "0" indicates that the updating of data has not been performed in the slot corresponding to this bit, while a bit of "1" indicates that the updating of data has been performed in the slot corresponding to this bit.

Figure 22:
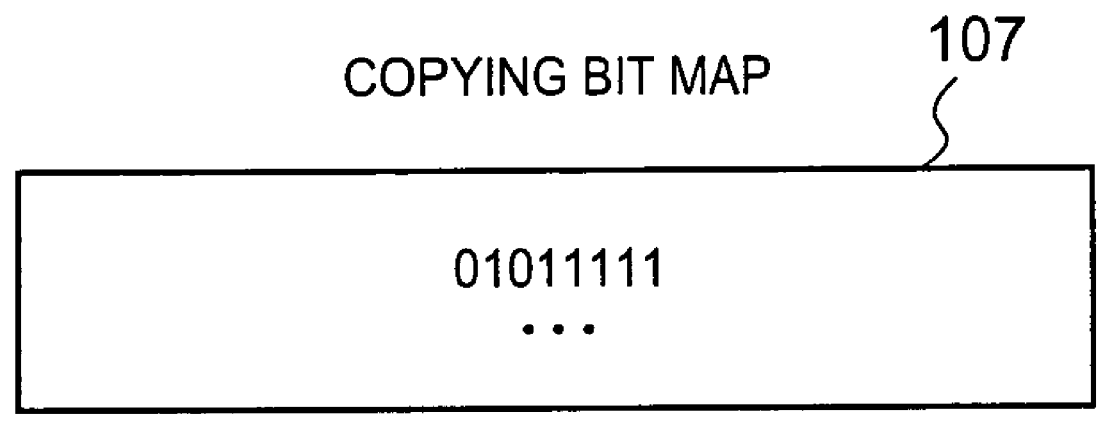

FIG. 22 is an explanatory diagram showing one example of the copying bit map 107 shown in FIG. 16.

In FIG. 22, the copying bit map 107 indicates whether or not data stored in the primary (logical) volume has been copied into the pool region (115) following the reception of a snapshot preparation command from the server (1 or 3) by the disk control device (11) (i.e., the CHA (15 or 17) of the disk control device (11)). A bit of "0" indicates that the copying of data in the slot corresponding to this bit into the pool region (115) has been completed, while a bit of "1" indicates that data in the clot corresponding to this bit has not been copied into the pool region (115).

Figure 23:
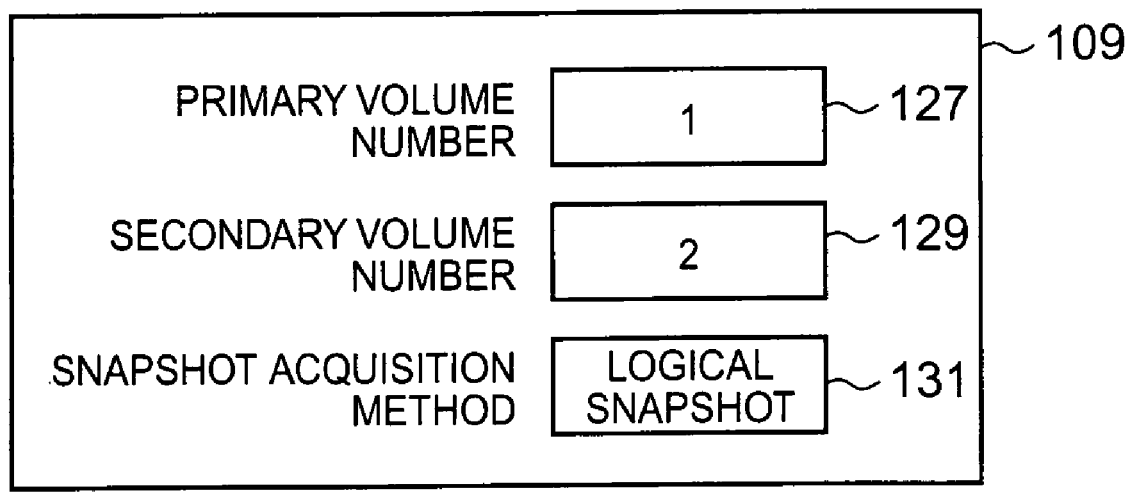
FIG. 23 is an explanatory diagram showing one example of the pair control information shown in FIG. 16.

FIG. 23 is an explanatory diagram showing one example of the pair control information 109 shown in FIG. 16.

In FIG. 23, the pair control information 109 is information that is used to discriminate object primary (logical) volumes and secondary (logical) volumes. The pair control information 109 includes three types of information, i.e., a primary (logical) volume number 127 that is used to discriminate the primary (logical) volume, a secondary (logical) volume number 129 that is used to discriminate the secondary (logical) volume, and a snapshot acquisition method 131 that is used to discriminate the snapshot data acquisition method that is used.

As is shown in the figures, either a logical snapshot or a physical snapshot is stored in the snapshot acquisition method 131.

Figure 24:
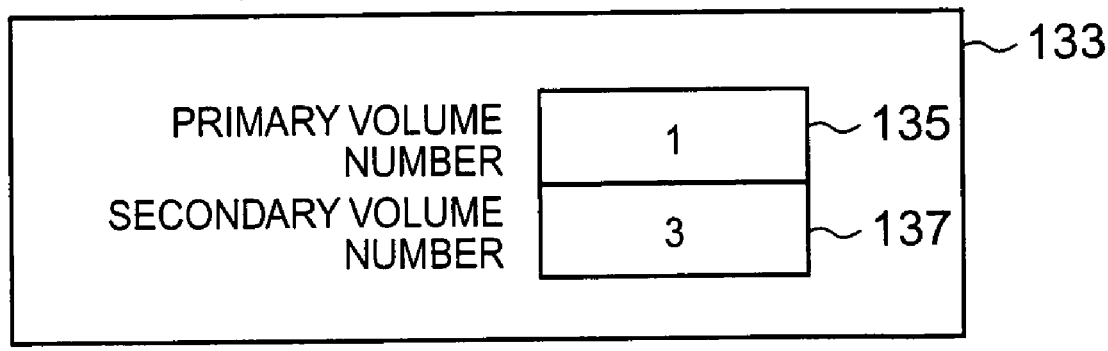
FIG. 24 is an explanatory diagram showing one example of the command parameters of the snapshot preparation command in the storage system constituting a fourth embodiment of the present invention.

FIG. 24 is an explanatory diagram showing one example of the command parameters of the snapshot preparation command in the storage system (5) of the fourth embodiment of the present invention.

In FIG. 24, the command parameters 133 of the snapshot preparation command include two types of information, i.e., a primary (logical) volume number 135 and a secondary (logical) volume number 137. The primary (logical) volume 135 is a (logical) volume number that is required in order to access the original data, i.e., a number that is assigned to the (logical) volume in which the original data is stored. On the other hand, the secondary (logical) volume number 137 is a (logical) volume number that is required in order to access the snapshot data, i.e., a number that is assigned to the (logical) volume in which the snapshot data is to be stored.

In the example shown in FIG. 24, "1" is stored as the primary (logical) volume number 135, and "3" is stored as the secondary (logical) volume number 137.

Figure 25:
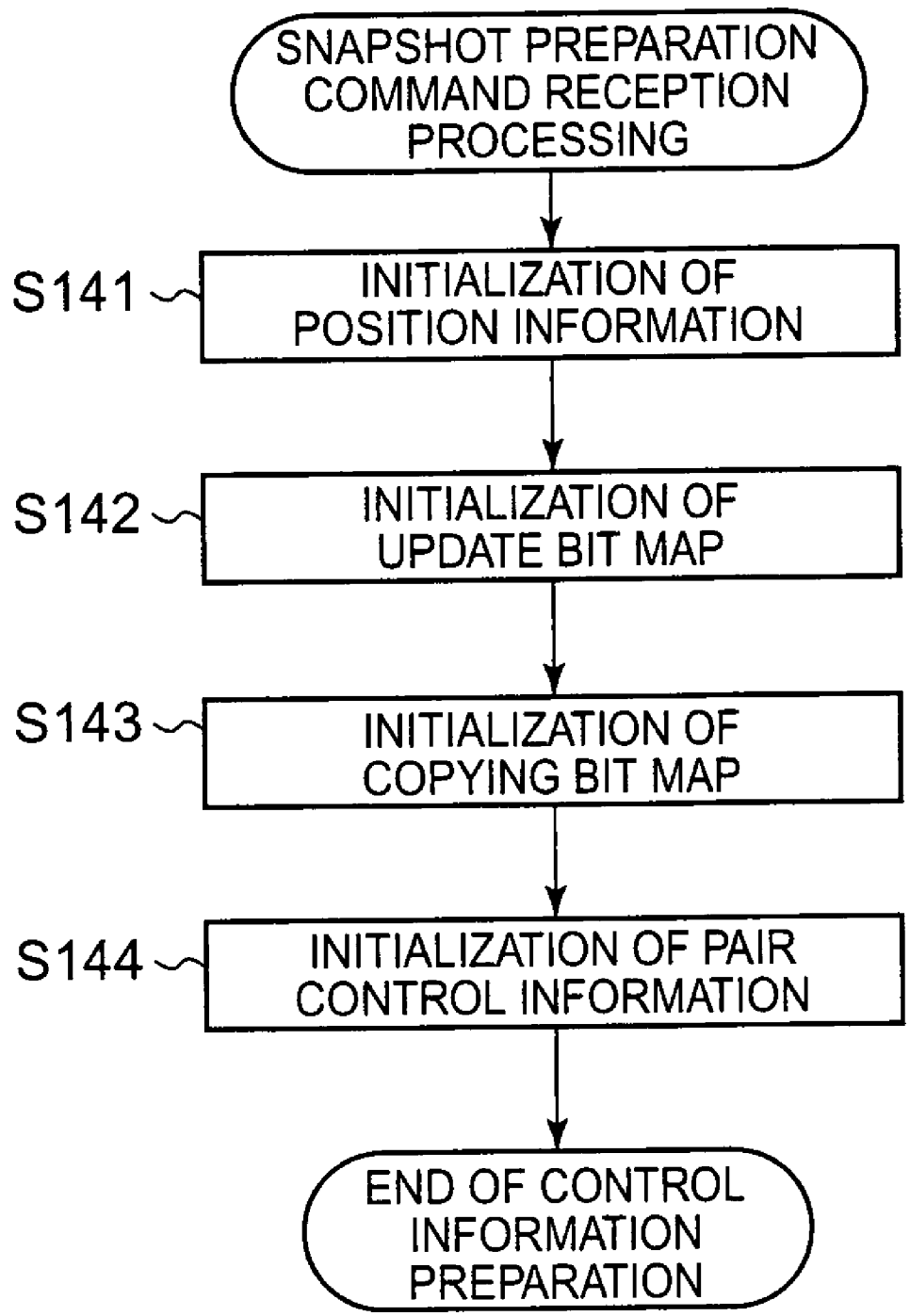
FIG. 25 is a flow chart which shows the procedure of the snapshot data preparation command reception processing that is performed in the storage system constituting a fourth embodiment of the present invention.

FIG. 25 is a flow chart which shows the procedure of the snapshot data preparation command reception processing that is performed by the storage system (5) of the fourth embodiment of the present invention.

In FIG. 25, when a snapshot data preparation is transmitted from the server (1 or 3) via the communications network (7 or 9), the disk control device (11) (i.e., the CHA (15) or (17) of the disk control device (11)) receives this preparation request. Then, the position information 103 shown in FIG. 20 is read out from the control memory 23, and this position information 103 is initialized (step S141). Specifically, immediately after the CHA (15 or 17) receives the snapshot data preparation request from the server (1 or 3), the data that is to be stored in the secondary (logical) volume is stored in the primary (logical) volume. Accordingly, in the position information 103, the slot number is set as the primary (logical) volume slot number 121, and the primary (logical) volume number in the command parameters in the snapshot data preparation command is set as the volume number 123.

Next, the update bit map 105 shown in FIG. 21 is read out from the control memory 23, and this update bit map 105 is initialized (step S142). The reason that this processing is performed is as follows: namely, since data updating is not performed in either of the slots of the primary (logical) volume or secondary (logical) volume immediately after the snapshot data preparation request is received from the server (1 or 3) by the CHA (15 or 17), it is necessary to switch all of the bits to "off" (0).

Next, the copying bit map 107 shown in FIG. 22 is read out from the control memory 23, and this copying bit map 107 is initialized (step S143). The reason that this processing is performed is as follows: namely, since the data that is stored in the primary (logical) volume is not copied into the pool region (115) immediately after the snapshot data preparation request is received from the server (1 or 3) by the CHA (15 or 17), it is necessary to switch all of the bits to "off" (0).

Next, the pair control information 109 shown in FIG. 23 is read out from the control memory 23, and this pair control information 109 is initialized (step S144). Specifically, the number stored in the primary (logical) volume number 135 of the command parameters 133 of the snapshot data preparation command shown in FIG. 24 is stored in the region of the primary (logical) volume number 127 contained in the pair control information 109. Furthermore, the number stored in the secondary (logical) volume number 137 of the command parameter 133 of the snapshot data preparation command shown in FIG. 24 is stored in the region of the secondary (logical) volume number 129 contained in the pair control information 109.

As a result, the series of processing operations involved in the reception of snapshot data preparation commands is ended.

Figure 26:
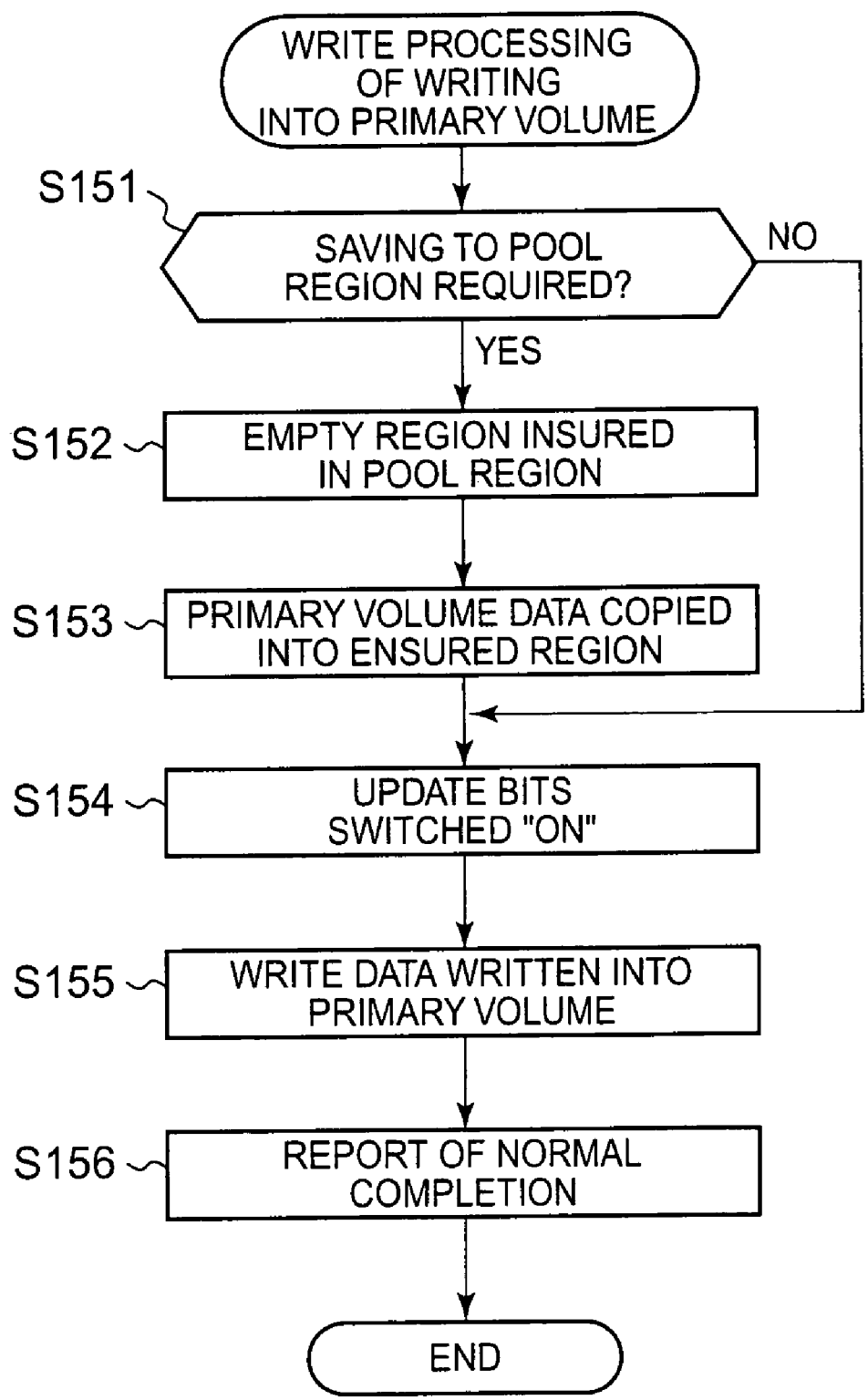
FIG. 26 is a flow chart which shows the procedure of the write processing for writing into the primary (logical) volume that is performed in the storage system constituting a fourth embodiment of the present invention.

FIG. 26 is a flow chart which shows the procedure of the write processing of writing into the primary (logical) volume that is performed in the storage system (5) of the fourth embodiment of the present invention.

In FIG. 26, in the write processing of writing into the primary (logical) volume, the disk control device (11) first performs a check in order to ascertain whether or not it is necessary to save the data that is stored in the primary (logical) volume (shown in FIG. 18) in the pool region 115 (step S151). If it is judged as a result of this check that saving is necessary (YES in step S151), then an empty region is ensured in the pool region 115 (step S152). Next, the data stored in the primary (logical) volume is copied into the empty region that is ensured in the pool region 115 (step S153).

Next, the bits corresponding to the slots in which data is to be updated in the primary (logical) volume in the update bit map 105 are switched to "on" (1) (step S154), and the write data (transmitted from the side of the server (1 or 3)) is written into the slots (in which data updating is to be performed) in the primary (logical) volume (step S155). Then, the series of processing operations is completed by the disk control device 11 (i.e., the CHA (15 or 17) of the disk control device (11) reporting to the server (1 or 3) that the writing of the write data into the primary (logical) volume has been completed in a normal manner (step S156).

Furthermore, when it is judged as a result of the check that saving is not necessary (NO in step S151), this means that the data stored in the primary (logical) volume has already been saved; accordingly, the processing immediately proceeds to processing operation shown in step S154.

Figure 27:
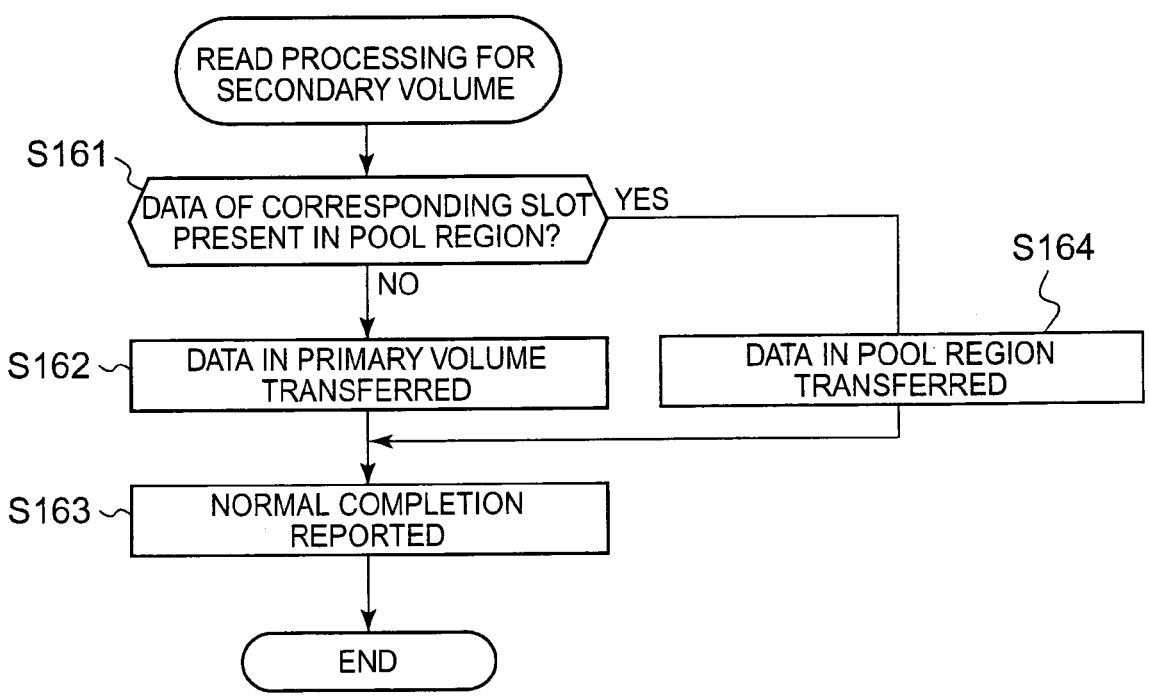
FIG. 27 is a flow chart which shows the procedure of the read processing that is performed with respect to the secondary (logical) volume in the storage system constituting a fourth embodiment of the present invention.

FIG. 27 is a flow chart which shows the procedure of the read processing with respect to the secondary (logical) volume that is performed by the storage system (5) in the fourth embodiment of the present invention.

In FIG. 27, in the case of read processing with respect to the secondary (logical) volume, the disk control device (11) first reads out the pool region control information 101 shown (for example) in FIG. 19 from the control memory 23, and checks whether or not the data of the corresponding slot in the secondary (logical) volume is present in the pool region 115 (shown in FIG. 18) (step S161). If it is found as a result of the check that the data of the slot is not present in the pool region 115 (NO in step S161), the data stored in the primary (logical) volume is transferred to the side of the server (1 or 3) (step S162). At the same time, the disk control device (11) (i.e., the CHA (15 or 17) of the disk control device (11)) reports to the server (1 or 3) that read processing with respect to the secondary (logical) volume has been completed in a normal manner (step S163), and the series of processing operations is ended.

Furthermore, if it is found as a result of the check that the data of the slot is present in the pool region 115 (YES in step S161), the data of the pool region 115 is transferred to the side of the server (1 or 3) (step S164), and the series of processing operations is completed via the processing operation shown in step S163.

Figure 28:
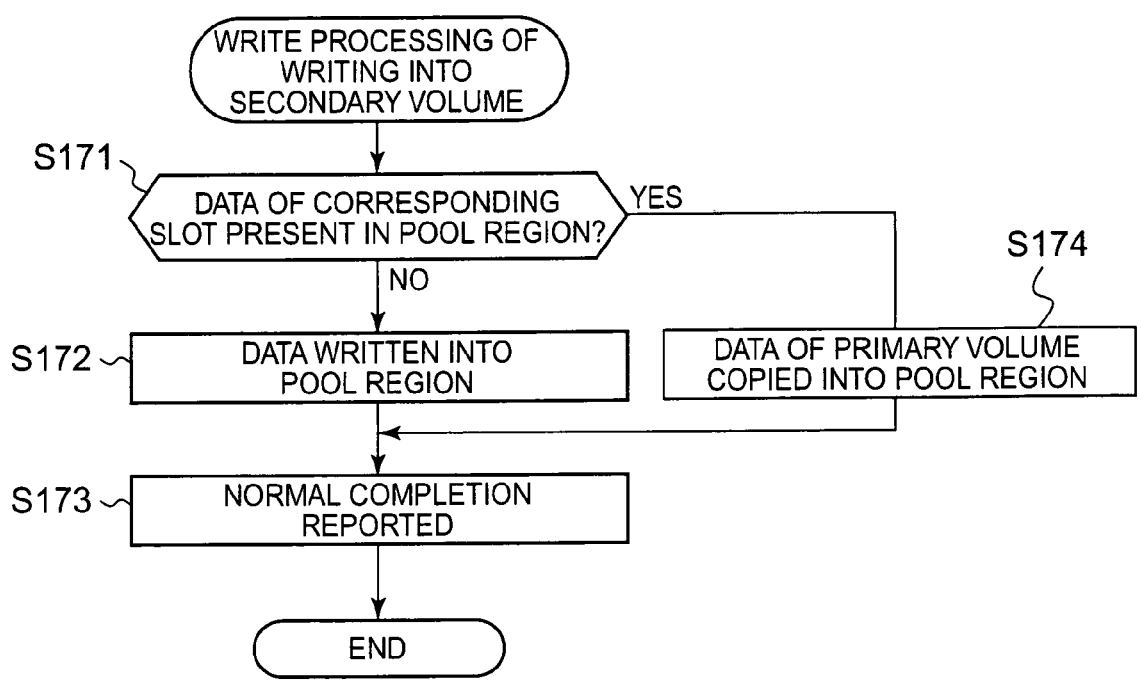
FIG. 28 is a flow chart which shows the procedure of the write processing for writing into the secondary (logical) volume that is performed in the storage system constituting a fourth embodiment of the present invention.

FIG. 28 is a flow chart which shows the procedure of the write processing of writing into the secondary (logical) volume that is performed in the storage system (5) of the fourth embodiment of the present invention.

In FIG. 28, in the case of write processing with respect to the secondary (logical) volume, the disk control device (11) first checks in order to ascertain whether or not the data that is stored in the corresponding slot in the secondary (logical) volume is present in the pool region 115 (shown in FIG. 18) (step S171). If it is found as a result of the check that the data of the slot is not present in the pool region 115 (NO in step S171), the disk control device (11) writes the data transferred from the side of the server (1 or 3) into the pool region 115 (step S172). Then, the disk control device (11) (i.e., the CHA (15 or 17) of the disk control device (11)) reports to the server (1 or 3) that the write processing of the writing into the secondary (logical) volume has been completed in a normal manner (step S173), and thus ends the series of processing operations.

Furthermore, if it is found as a result of the check that the data of the slot is present in the pool region 115 (YES in step S171), the data stored in the corresponding slot in the primary (logical) volume that forms a pair with the secondary (logical) volume is copied into the pool region 115 (step S174), and the series of processing operations is ended via the processing operations indicated in step S172 and step S173.

Figure 29:
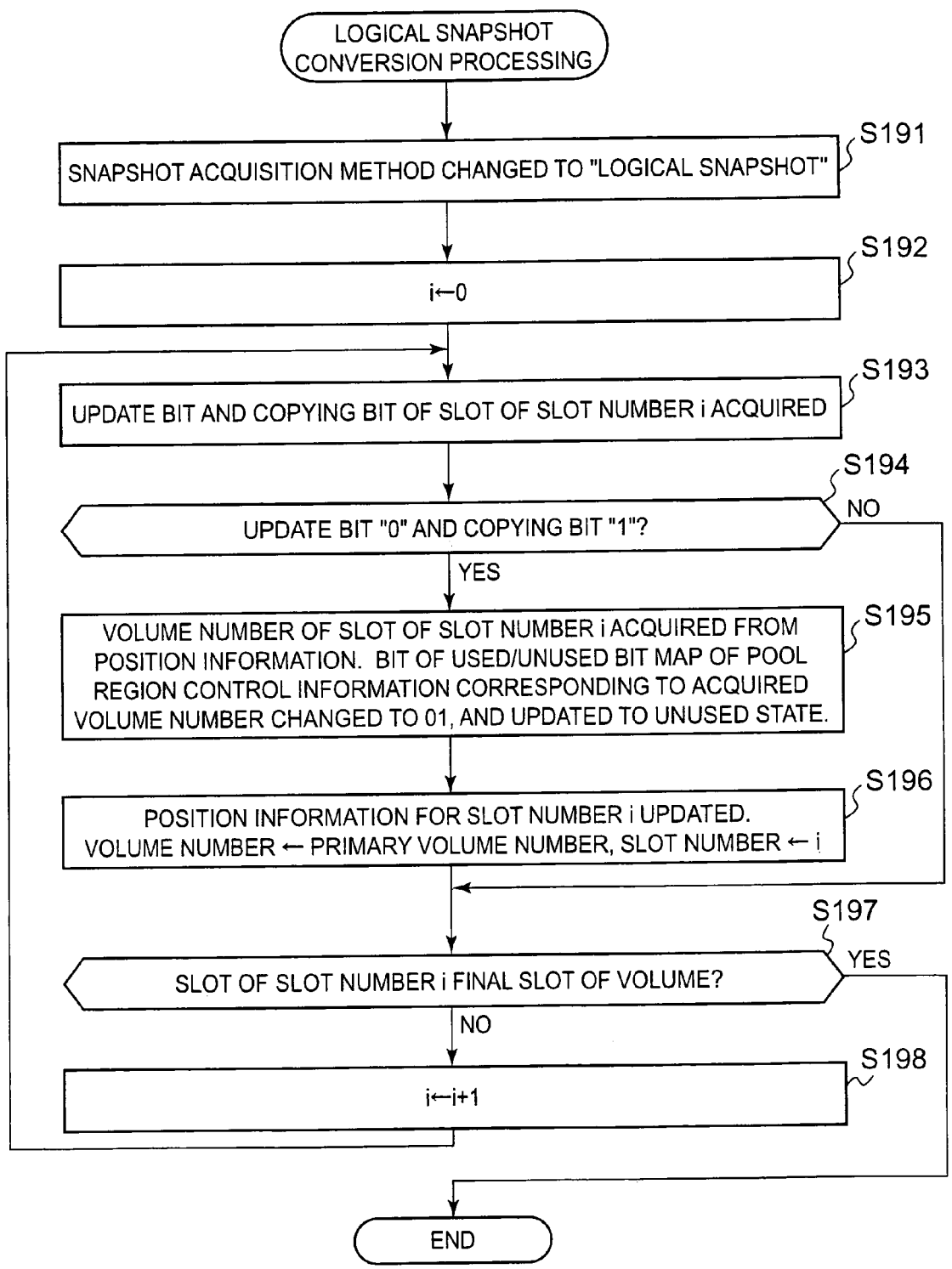
FIG. 29 is a flow chart which shows the procedure of the logical snapshot conversion processing that is performed in the storage system constituting a fourth embodiment of the present invention.

FIG. 29 is a flow chart which shows the procedure of the logical snapshot conversion processing that is in the storage system (5) of the fourth embodiment of the present invention.

In FIG. 29, the disk control device (11) first alters the snapshot acquisition method 131 in the pair conversion information 109 shown in FIG. 23 (from the control memory 23) from physical snapshot to logical snapshot (step S191). Next, the slot number i in the position information 103 shown in FIG. 20 (from the control memory 23) is set at "0" (step S192). Next, the update bit map 105 shown in FIG. 21 is read out from the control memory 23, and bits corresponding to slots to which a slot number of i (=0) is assigned (hereafter referred to as "update bits"), and bits corresponding to slots to which the slot number of i (=0) is assigned following read-out of the copying bit map 107 shown in FIG. 22 from the control memory 23 (hereafter referred to as "copying bits"), are acquired (step S193).

Next, a check is made in order to ascertain whether or not the update bit is "0", and whether or not the copying bit is "1" (step S194). If it is found as a result of this check that the update bit is "0", and that the copying bit is "1" (YES in step S194), the number of the (logical) volume containing the slot with a slot number of i is acquired from the position information 103. Then, the pool region control information 101 shown in FIG. 19 is read out from the control memory 23, the respective bits of the used/unused bit map 119 corresponding to the (logical) volume number are set at "0", and the pool region is set in an unused state (step S195).

Next, the updating of the position information 103 of the slot number i is performed. Specifically, in the position information 103, the (logical) volume number is reset to the primary (logical) volume number, and the slot number is reset to i (step S196). Then, a check is made in order to ascertain whether or not the reset slot number i is the final slot ($35_n$) in the (logical) volume (33) (S197). If it is found as a result of this check that the slot number i is not the final slot of the (logical) volume (33) (NO in step S197), the slot number i is reset to +1 (step S198), and the processing proceeds to the processing operation shown in step S193.

If the update bit is not "0", and the copying bit is not "1" (NO in step S194), the processing proceeds to the processing operation shown in step S197. Furthermore, if the slot number i is the final slot of the (logical) volume (33) (YES in step S197), the series of logical snapshot conversion processing operations is ended.

Figure 30:
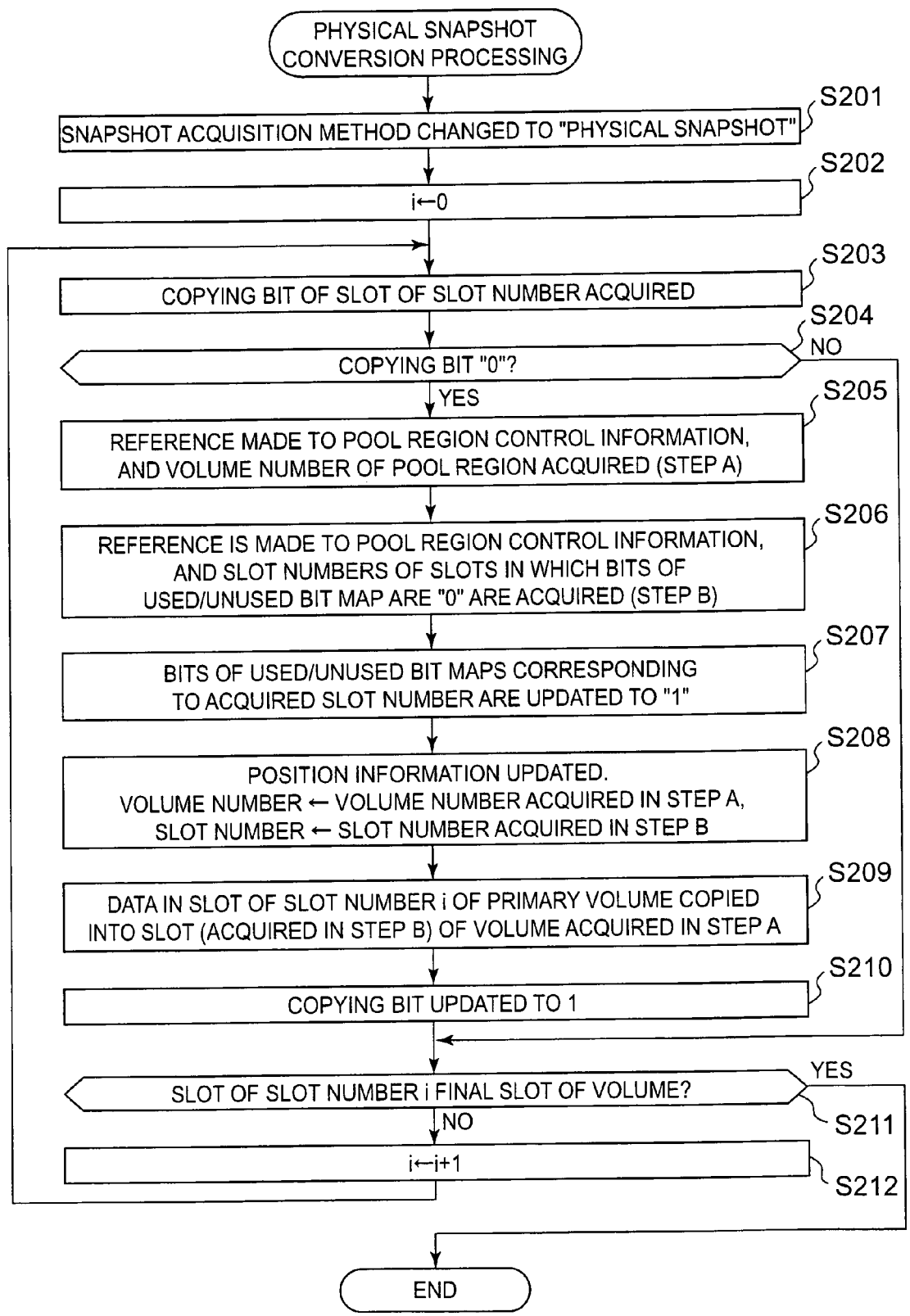
FIG. 30 is a flow chart which shows the procedure of the physical snapshot conversion processing that is performed in the storage system constituting a fourth embodiment of the present invention.

FIG. 30 is a flow chart which shows the procedure of the physical snapshot conversion processing that is performed in the storage system (5) of the fourth embodiment of the present invention.

In FIG. 30, the disk control device (11) first changes the snapshot acquisition method 131 in the pair control information 109 shown in FIG. 23 (from the control memory 23) from logical snapshot to physical snapshot (step S201). Next, the slot number i in the position information 103 shown in FIG. 20 (from the control memory 23) is set at "0" (step S202). Next, the copying bit map 107 shown n FIG. 22 is read out from the control memory 23, and the bits corresponding to slots to which the slot number of i (=0) is assigned (hereafter referred to as "copying bits") are acquired (step S203).

Next, a check is made in order to ascertain whether or not the copying bit is "0" (step S204). If it is found as a result of this check that the copying bit is "0" (YES in step S204), the pool region control information 101 shown in FIG. 19 is read out from the control memory 23, and the (logical) volume number is acquired from this pool region control information 101 (step S205). Next, reference is made to the pool region control information 101, the slot numbers of slots in which the bit of the used/unused bit map 119 is "0" are acquired (step S206), and the bit of the used/unused bit map 119 of the pool region control information 101 of the slots corresponding to the acquired slot numbers is set at "1" (step S207).

Next, the updating of the position information 103 of the slot number i is performed. Specifically, in the position information 103, the (logical) volume number is reset to the (logical) volume number acquired in step S205, and the slot number is reset to the slot number acquired in step S206 (step S208). Nest, the data stored in the slot to which a slot number of i is assigned in the primary (logical) volume is copied into the slot with the slot number acquired in step S206 of the (logical) volume acquired in step S205 (step S209). Then, the copying bit in the copying bit map 107 shown in FIG. 22 is set at "1" (step S210).

Next, a check is made in order to ascertain whether or not the slot number i reset in step S208 is the final slot (35n) in the (logical) volume (33) (step S211). If it is found as a result of this check that the slot number i is not the final slot of the (logical) volume (33) (NO in step S211), then the slot number i is rest to +1 (step S212), and the processing proceeds to the processing operation indicated in step S203.

If the copying bit is not "0" (NO in step S204), the processing proceeds to the processing operation indicated in step S211. Fort, if the slot number i is the final slot of the (logical) volume (33) (YES in step S211), the series of physical snapshot conversion processing operations is ended.

Figure 31:
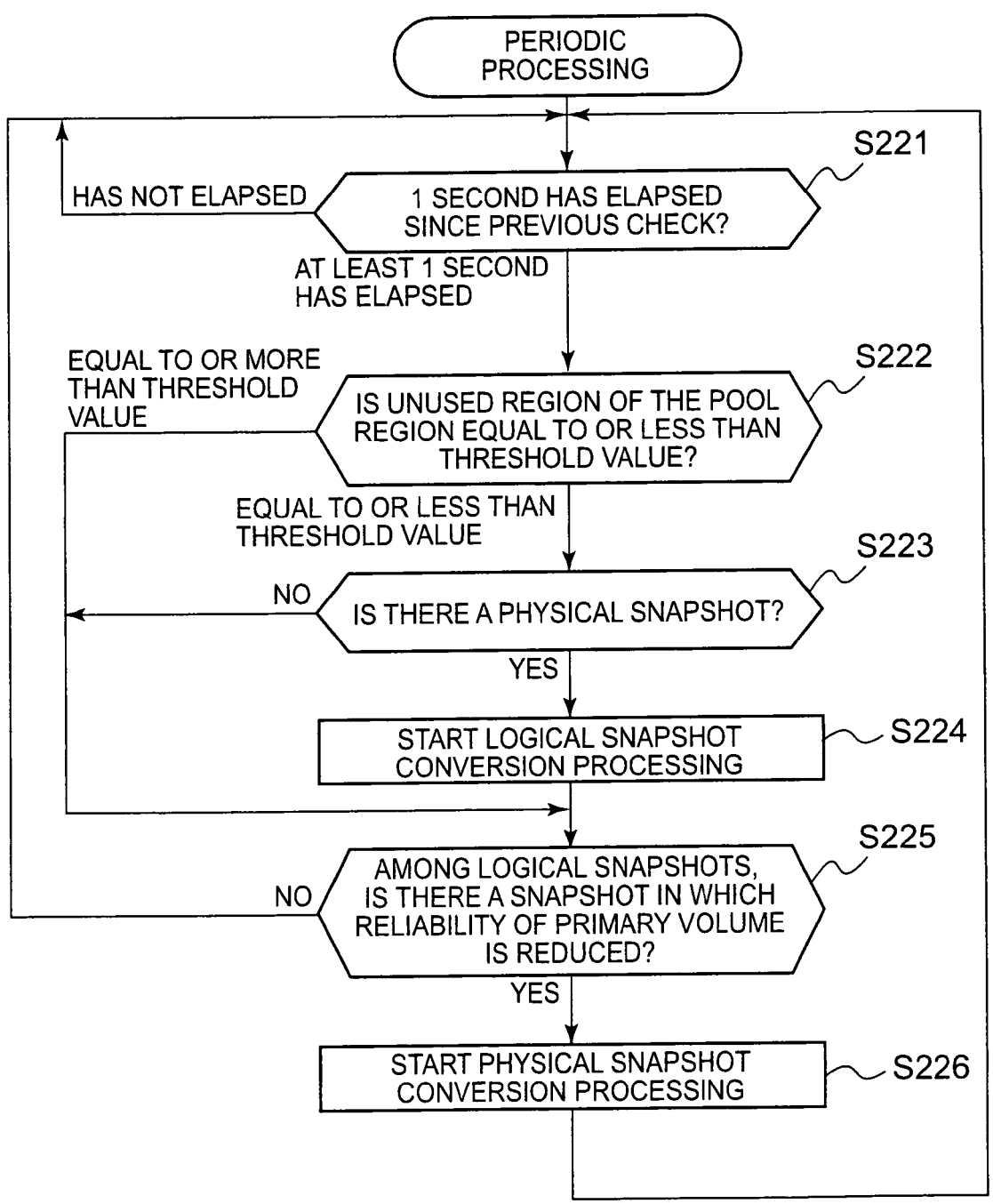
FIG. 31 is a flow chart which shows the procedure of the periodic processing that is performed in the storage system constituting a fourth embodiment of the present invention.

FIG. 31 is a flow chart which shows the procedure of the periodic processing that is performed in the storage system (5) of the fourth embodiment of the present invention.

In FIG. 31, a check is first made in order to ascertain whether or not a period of 1 second has elapsed since a check was previously made in order to ascertain whether physical processing was to be performed or whether logical snapshot processing was to be performed (step S221). If it is found as a result of this check that a period of 1 second or longer has elapsed, a check is next made with reference to (for example) the pool region control information 101 shown in FIG. 19 in order to ascertain whether or not the unused region of the pool region 115 as shown in FIG. 18 is equal to or less than a specified threshold value (step S222). If it is found as a result of this check that the unused region of the pool region 115 is equal to or less than the specified threshold value, a check is made in order to ascertain whether or not physical snapshot data is present (step S223).

If it is found as a result of this check that physical snapshot data is present, physical snapshot data conversion processing is started (step S224), and a check is made in order to ascertain whether or not there are any volumes with reduced reliability among the primary (logical) volumes in which original data corresponding to the logical snapshot data is stored (step S225). If it is found as a result of this check that primary (logical) volumes with reduced reliability are present, physical snapshot conversion processing is started (step S226), and the processing proceeds to the processing operation indicated in step S221.

When a period of 1 second or longer has not elapsed from the time that a check was previously made as to whether physical snapshot processing was to be performed or whether logical snapshot processing was to be performed (step S221), the processing does not proceed to the processing operation from step S222 on until a period of 1 second or longer has elapsed.

When the unused region of the pool region 115 is not equal to or less than the specified threshold value (step S222), and when physical snapshot data is not present (step S223), the processing proceeds to the processing operation shown in step S225.

Furthermore, when there are no volumes showing a drop in reliability among the primary (logical) volumes in which original data corresponding to logical snapshot data is stored (step S225), the processing proceeds to the processing operation shown in step S221.

In the fourth embodiment of the present invention, as was described above, when it is judged that the empty region in the pool region is reduced during the preparation of snapshot data, a physical snapshot system is used, while when it is judged that this is not so, a logical snapshot system is used. Accordingly, in the storage system 5, this system can be devised so that abnormal ending of the snapshot data preparation processing as result of the pool region becoming filled with saved data from the from the primary (logical) volume can be prevented.

Preferred embodiments of the present invention were described above. However, these embodiments are merely examples that are used to illustrate the present invention; the scope of the present invention is not limited to these embodiments alone. The present invention can be worked in various configurations.

What is claimed is:

1. A storage system comprising:
   a physical snapshot execution part which writes data that has been updated into both a primary storage device and a secondary storage device;
   a logical snapshot execution part which writes input data into said primary storage device, and which writes differential data between said data and data prior to updating into said secondary storage device;
   an update data search part which performs a search in order to ascertain whether or not data that is to be updated is present in said primary storage device involved in a snapshot data preparation request when such a preparation request is received from a higher-level device;
   a data updating amount judgment part which judges whether or not the amount of updated data in said primary storage device is greater than a specified value when said update data search part finds that update data is present in said primary storage device; and
   a snapshot execution part selection part which selectively drives said physical snapshot execution part when said data updating amount judgment part judges that said amount of updated data is greater than said specified value, and which selectively drives said logical snapshot execution part when said data updating amount judgment part judges that said amount of updated data is less than said specified value, or when no updated data is present in said storage device.

2. The storage system according to claim 1, wherein said specified value is a preset threshold value relating to the amount of updated data, and said threshold value is a default value.

3. The storage system according to claim 1, wherein said specified value is a preset threshold value relating to the amount of updated data, and said threshold value can be freely set or altered by a user.

4. The storage system according to claim 1, wherein, prior to the driving of said physical snapshot execution part or said logical snapshot execution part, said snapshot execution part selection part initializes information relating to said data updating of said device involved in said snapshot data preparation request among information relating to the updating of data that is set for said first and second storage devices.

5. The storage system according to claim 1, wherein deletion of snapshot data that is prepared by said physical snapshot execution part or said logical snapshot execution part includes at least processing that initializes the information relating to the updating of said data of said primary storage device involved in said snapshot data preparation request.

6. The storage system according to claim 1, wherein the processing of writing data into said primary storage device based on a data write command from said higher-level device is accomplished by performing processing which indicates that data has been updated in information relating to the updating of data corresponding to said primary storage device.

7. A storage system comprising:
a physical snapshot execution part which writes data that has been updated into both a primary storage device and a secondary storage device;
a logical snapshot execution part which writes input data into said primary storage device, and which writes differential data between said data and data prior to updating into said secondary storage device;
an update data search part which performs a search in order to ascertain whether or not data that is to be updated is present in said primary storage device involved in a snapshot data preparation request when such a preparation request is received from a higher-level device;
an access degree-of-competition judgment part which, when said update data search part finds update data in said primary storage device, and said primary storage device and said secondary storage device are simultaneously accessed from said higher-level device, judges whether or not an access degree of competition between access to said primary storage device and access to said secondary storage device is high; and
a snapshot execution part selection part which selectively drives said physical snapshot execution part when said access degree-of-competition judgment part judges that said access degree of competition is high, and which selectively drives said logical snapshot execution part when said access degree-of-competition judgment part judges that said access degree of competition is not high.

8. The storage system according to claim 7, wherein said access degree-of-competition judgment part judges whether said access degree of competition is high or not by checking a degree of utilization of said primary storage device involved in said snapshot data preparation request.

9. A storage system comprising:
a physical snapshot execution part which writes data that has been updated into both a primary storage device and a secondary storage device;
a logical snapshot execution part which writes input data into said primary storage device, and which writes differential data between said data and data prior to updating into said secondary storage device;
an update data search part which performs a search in order to ascertain whether or not data that is to be updated is present in said primary storage device involved in a snapshot data preparation request when such a preparation request is received from a higher-level device;
a trouble degree-of-occurrence judgment part which judges whether or not a degree of occurrence of trouble in said primary storage device is high when said update data search part finds update data in said primary storage device; and
a snapshot execution part selection part which selectively drives said physical snapshot execution part when said trouble degree-of-occurrence judgment part judges that said degree of occurrence of trouble in said primary storage device is high, and which selectively drives said logical snapshot execution part when said trouble degree-of-occurrence judgment part judges that said degree of occurrence of said trouble is not high.

10. The storage system according to claim 9, wherein said trouble degree-of-occurrence judgment part judges whether said degree of occurrence of said trouble is high or not by checking a trouble occurrence rate of an HDD (hard disk drive) constituting said primary storage device.

11. The storage system according to claim 9, wherein said trouble occurrence rate of said HDD is determined in accordance with the magnitude of a load in one or a plurality of HDD(s) actually holding data that is assigned to said primary storage device involved in said snapshot data preparation request.

12. The storage system according to claim 11, wherein said snapshot execution part selection part drives said physical snapshot execution part if the magnitude of said load in said one or plurality of HDD(s) is greater than a specified threshold value, and said snapshot execution part selection part drives said logical snapshot execution part if the magnitude of said load is smaller than said specified threshold value.

13. The storage system according to claim 11, wherein the magnitude of said load in said one or plurality of HDD(s) is determined by synthesizing a history of IOPS (I/O operations) of said primary storage volume that occur during snapshot data preparation, and a history of IOPS of said secondary storage volume that occur during said snapshot data preparation.

14. A storage system comprising:
a physical snapshot execution part which writes data that has been updated into both a primary storage device and a secondary storage device;
a logical snapshot execution part which writes input data into said primary storage device, and which writes differential data between said data and data prior to updating into said secondary storage device;
an empty region monitoring part which monitors an empty region of a data storage region that is provided in order to save data stored in said primary storage device involved in a snapshot data preparation request when there is such a data preparation request from a higher-level device; and
a snapshot execution part selection part which selectively drives said physical snapshot execution part when said empty region monitoring part judges that said empty region in said data storage region is small, and which selectively drives said logical snapshot execution part when said empty region monitoring part judges that said empty region is not small.

15. The storage system according to claim 14, wherein monitoring of said empty region of said data storage region by said empty region monitoring part, selection of the driving of said physical or logical snapshot execution part by said snapshot execution part selection part, and checking reliability of said primary storage device in which original data corresponding to snapshot data prepared by said logical snapshot execution part is stored are performed periodically at specified time intervals.

16. A method for preparing snapshot data in a storage system, comprising:
- a first step of executing a physical snapshot that writes data that has been updated into both a primary storage device and a secondary storage device;
- a second step of executing a logical snapshot that writes input data into said primary storage device, and that writes differential data between this data and data prior to updating into said secondary storage device;
- a third step of conducting a search in order to ascertain whether or not data that is to be updated is present in said primary storage device involved in a snapshot data preparation request when such a preparation request is received from a higher-level device;
- a fourth step of judging whether or not an amount of data updated in said primary storage device is greater than a specified value, when update data is found in said primary storage device in said third step; and
- a fifth step in which, when it is judged that said amount of updated data is greater than said specified value, then execution of said physical snapshot is selected, while when it is judged that said amount of updated data is smaller than said specified value or when update data is not found in said storage device, then execution of said logical snapshot is selected.

* * * * *